United States Patent
Shimamori et al.

(10) Patent No.: US 6,169,675 B1
(45) Date of Patent: Jan. 2, 2001

(54) DC/DC CONVERTER WITH IMPROVED OPERATION OF PLURAL PARALLEL SYNCHRONOUS RECTIFIERS

(75) Inventors: Hiroshi Shimamori; Shigeharu Yamashita; Kazutoshi Fuchigami, all of Kawasaki (JP)

(73) Assignees: Fujitsu Limited; Fujitsu Denso Ltd., both of Kawasaki (JP)

(*) Notice: Under 35 U.S.C. 154(b), the term of this patent shall be extended for 0 days.

(21) Appl. No.: 09/121,828

(22) Filed: Jul. 24, 1998

(30) Foreign Application Priority Data

Oct. 24, 1997 (JP) .................................... 9-292606

(51) Int. Cl.[7] .................................................. H02M 7/217
(52) U.S. Cl. ................................ 363/70; 363/89; 363/127
(58) Field of Search .................................. 363/69, 70, 89, 363/127

(56) References Cited

U.S. PATENT DOCUMENTS

| | | | |
|---|---|---|---|
| 4,716,514 | * 12/1987 | Patel | 363/89 |
| 4,870,555 | * 9/1989 | White | 363/127 |
| 5,144,547 | * 9/1992 | Masamoto | 363/127 |
| 5,319,536 | * 6/1994 | Malik | 363/70 |
| 5,343,383 | * 8/1994 | Shinada et al. | 363/127 |
| 5,430,640 | * 7/1995 | Lee | 363/127 |
| 5,528,480 | * 6/1996 | Kikinis et al. | 363/89 |
| 5,672,958 | * 9/1997 | Brown et al. | 363/69 |
| 5,734,563 | * 3/1998 | Shinada | 363/127 |
| 5,774,350 | * 6/1998 | Notaro et al. | 363/89 |

FOREIGN PATENT DOCUMENTS 5-199744  8/1993 (JP) .

* cited by examiner

*Primary Examiner*—Jeffrey Sterrett
(74) *Attorney, Agent, or Firm*—Armstrong, Westerman, Hattori, McLeland & Naughton

(57) ABSTRACT

A synchronous rectifying type DC-DC converter including an auxiliary winding, provided on a secondary side of a transformer, for supplying voltages assuming polarities opposite to each other to control terminals of a rectifying switch and of a fly wheel switch, and the rectifying switch and the fly wheel switch are so constructed as not to be turned ON/OFF by a voltage generated on a supply path of an electric current to a load from a secondary winding of the transformer. When connecting a plurality of DC-DC converters in parallel and operating these converters in parallel, an output of any one of the converters stops, and, even if outputs of the other DC-DC converters are inputted to the DC-DC converter concerned and the electric current flows into the current supply path, a voltage based on the above current is not applied to control terminals of the rectifying switch and of the fly wheel switch. The rectifying switch and the fly wheel switch are not therefore turned ON. Accordingly, a large quantity of electric current is prevented from flowing into the DC-DC converter concerned.

13 Claims, 11 Drawing Sheets

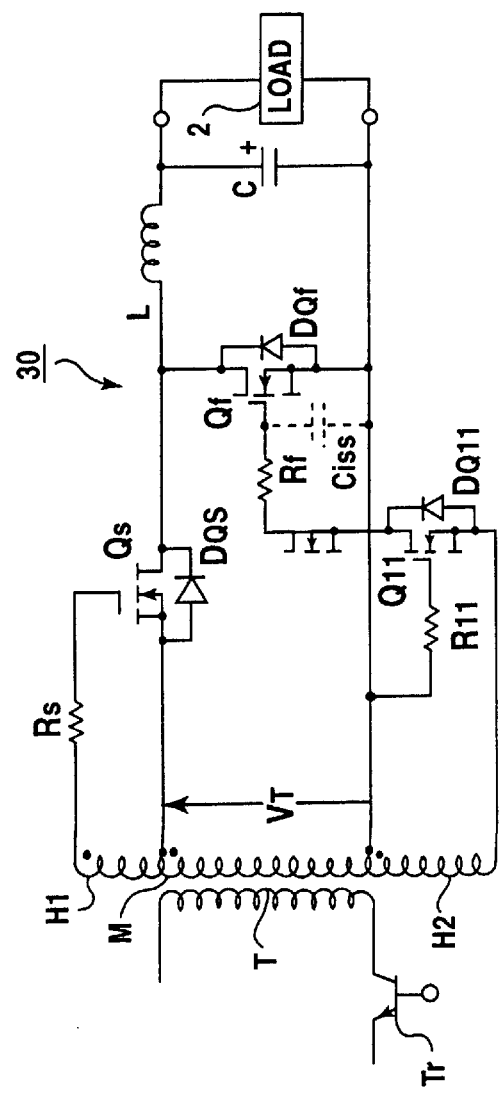
FIG.3(a)
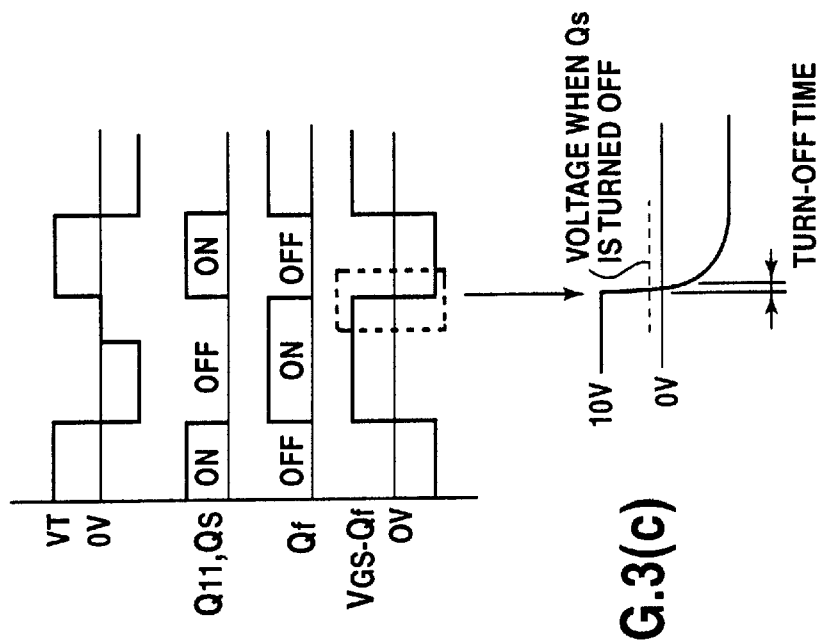
FIG.3(b)
FIG.3(c)

DC/DC CONVERTER WITH IMPROVED OPERATION OF PLURAL PARALLEL SYNCHRONOUS RECTIFIERS

BACKGROUND OF THE INVENTION

1. Field of the Invention

The present invention relates to a synchronous rectifying type DC-DC converter for supplying a load, such as an electric apparatus, etc., with substantially fixed DC electric power.

2. Description of the Related Art

A synchronous rectifying type DC-DC converter has hitherto been known as a converter for supplying a load, such as an electronic apparatus, etc., with substantially fixed DC electric power. FIG. 11(a) is a diagram showing a circuit construction of the prior art synchronous rectifying type DC-DC converter. FIG. 11(b) is a time chart showing an operation of a circuit element illustrated in FIG. 11(a).

FIG. 11(a) shows synchronous rectifying type DC-DC converters (hereinafter simply referred to as "converters") 1a, 1b, 1c having the same construction connected in parallel to a load 2. Herein, the converter 1a is exemplified, wherein a transformer T is provided on an input side of the converter 1a. A switching transistor Tr is provided on a primary side of the transformer T, and an energy generated on the primary side is discontinuously supplied to a secondary side (the converter 1a). One terminal a choke coil L is connected via a conductor to one terminal of a secondary winding M of the transformer T. The other terminal of this choke coil L is connected to an output terminal of the converter 1a.

One terminal of a resistance Rs is connected to a conductor for connecting the secondary winding M to the choke coil L. The other terminal of the resistance Rs is connected to a gate of an enhancement type MOS-FET (a MOS type electric field effect transistor: hereinafter abbreviated to "FET") Qs serving as a rectifying switch. A source of the FET Qs is connected to an output terminal of the converter 1a via a conductor. A drain of the FET Qs is connected to the other terminal of the secondary winding M via a conductor. Then, the FET Qs equivalently includes a parasitic diode DQs through which to connect a source to a drain thereof, and through which a direction from the source to the drain is set as a forward direction.

One terminal of a resistance Rf is connected via a conductor to a conductor for connecting the drain go the FET Qs to the other terminal of the secondary winding M. The other terminal of the resistance Rf is connected to a gate of an FET Qf serving as a fly wheel switch. A source of the FET Qf is connected to a source of the FET Qs via a conductor. A drain of the FET Qf is connected to a conductor for connecting the secondary winding M to the choke coil L. This FET Qf equivalently includes a parasitic diode DQf through which to connect a source to a drain thereof, and through which the direction from the source to the drain is set as the forward direction. Then, a smoothing capacitor C is connected in parallel to the secondary winding M posterior to the choke coil L, and the output terminal of the converter 1a is connected to the load 2.

An operation of the above-described converter 1a will be explained with reference to FIG. 11(b). A positive voltage and a negative voltage are, as shown in FIG. 11(b), intermittently generated as a voltage VT on the secondary winding M of the transformer T with a given magnitude and a given period in accordance with the voltage application to the primary winding of the transformer T.

Herein, when the positive voltage VT is generated on the secondary winding M upon a turn-on of the switching transistor Tr, a gate voltage of the FET Qs rises, and the FET Qs is turned ON. At this time, the energy is accumulated in the choke coil L, then a smoothing capacitor C is charged with electric charge, and a thus smoothed fixed output is supplied to the load 2.

Thereafter, the voltage VT becomes negative after the switching transistor Tr has been turned OFF. Then, the gate voltage of the FET Qs decreases with the result that the FET Qs is turned OFF, and the gate voltage of the FET Qf increases with the result that the FET Qf is turned ON. Further, the voltage VT becomes negative, and the energy accumulated in the choke coil L is thereby released. Then, the electric current flows through a closed circuit consisting of the choke coil L, the load 2 and the FET Qf.

Thereafter, the transformer T is magnetically reset, and the generation of the negative voltage VT ceases (the voltage VT comes to "0"), at which time the FET Qf is turned OFF with the decrease in the gate voltage of the FET Qf, and a resistance value of the parasitic diode DQf becomes smaller than a resistance value between the source and the drain of the FET Qf. The electric current thereby flows through a closed circuit consisting of the choke coil L, the load 2 and the parasitic diode DQf.

Thereafter, when the positive voltage VT is again produced on the secondary winding M, the FET Qs is turned ON, and the source/drain resistance value of the FET Qs gets smaller than the resistance value of the parasitic diode DQf. The parasitic diode DQf is thereby turned OFF. Then, the operations described above is repeatedly performed. Thus, the converter 1a supplies the load 2 with the fixed output by turning ON/OFF the FET Qs and the FET Qf in synchronization with the change in the voltage VT from positive to negative.

The respective converters 1a, 1b, 1c are operated in parallel and each supply the load 2 with the outputs. With this contrivance, even if any one of the converters 1a, 1b, 1c stops due to a breakdown, the load 2 can be supplied with the electric current in a proper range.

If a failure is caused in any one of the converters 1a, 1b, 1c (if, e.g., oscillations of the voltage VT stop), there must be a possibility in which the following problems might arise. For example, if the oscillations of only the converter 1a stop due to the breakdown, the electric current having flows from the converters 1b, 1c toward the output terminal of the converter 1a, flows not through the load 2 but through the choke coil L of the converter 1a. Consequently, the gate voltages of the FET Qs and of the FET Qf rise. Therefore, the FET Qs and the FET Qf of the converter 1a are turned ON, and a large quantity of current flows into the converter 1a from the converters 1b, 1c. In consequence, the electric current supplied to the load 2 becomes deficient, an it follows that the FET Qs and the FET Qf might be damaged by the large quantity of current.

SUMMARY OF THE INVENTION

It is a primary object of the present invention, which was contrived to obviate the problems given above, to provide a synchronous rectifying type DC-DC converter capable of reducing a possibility of a damage caused when executing parallel operations.

To accomplish the above object, the present invention adopts constructions which follow. To be specific, according to a first aspect of the invention, a synchronous rectifying type DC-DC converter, a plural pieces are connected in parallel to a load, for supplying the load with a predetermined direct current output, comprises a rectifying switch connected in series to a secondary winding of a transformer, a fly wheel switch connected in parallel to the secondary winding of the transformer and an auxiliary winding induced by a voltage generated on a primary winding of the transformer, and giving output having polarities opposite to each other to a control terminal of the rectifying switch and to a control terminal of the fly wheel switch.

According to the first aspect of the invention, during parallel operation of the plurality of DC-DC converters, when an output of a certain DC-DC converter stops, and even if outputs of other DC-DC converters are inputted to this DC-DC converter, a sneak voltage is not applied to the rectifying switch and the fly wheel switch. Therefore, the rectifying switch and the fly wheel switch are not turned ON, and the large electric current can be prevented from flowing into the DC-DC converter concerned.

According a second aspect of the invention, the DC-DC converter according to the first aspect of the invention further comprises a drive keeping circuit for keeping an ON-status of said fly wheel switch during a period for which said transformer is magnetically reset.

According to the second aspect of the invention, with the magnetic reset of the transformer, even when the supply of the electric power to the control terminal of the fly wheel switch is cut off, the fly wheel switch is kept in an ON-status, and hence a releasing route via the fly wheel is held in the process of releasing the energy accumulated in a choke coil L.

According to a third aspect of the invention, the drive keeping circuit includes an accumulating element for accumulating an energy generated in the transformer and supplying the energy to the control terminal of the fly wheel switch.

According to the third aspect of the invention, even if the supply of the electric power to the control terminal f the fly wheel switch is cut off due to the magnetic reset of the transformer, the energy is supplied from the accumulating element, and hence the fly wheel switch can be kept in the ON-status.

According to a fourth aspect of the invention, the DC-DC converter according to the second or third aspect of the invention, when a voltage for driving the synchronous switch is generated in the transformer, a negative voltage is given to the control terminal of the fly wheel switch.

According to a fourth aspect of the invention, the main switch is turned ON, and, upon shifting to an ON-period of the synchronous switch, the negative voltage is supplied to the fly wheel switch, whereby the drive of the fly wheel switch is promptly stopped.

According to a fifth aspect of the invention, the DC-DC converter according to the fourth aspect of the invention further comprises a discharging switch, having a control terminal supplied with a voltage having a polarity opposite to that the applied voltage of the control terminal of the fly wheel switch, for discontinuing a supply of electric power to the control terminal of the fly wheel switch from the auxiliary winding.

According to a fifth aspect of the invention, the discharging switch and the fly wheel switch are alternately turned ON, and hence the discharging switch is turned ON when the fly wheel switch enters an OFF-period. Then, a negative output of the auxiliary winding is given the control terminal of the fly wheel switch, and the drive of the fly wheel switch is promptly stopped.

According to a sixth aspect of the invention, the DC-DC converter according to the second aspect further comprises a drive stopping circuit for turning OFF the fly wheel switch when an output does not generate in the transformer for a predetermined time.

According to a sixth aspect of the invention, when the output does not occur in the transformer for a duration of an oscillation-stopped state of the DC-DC converter, and even if the fly wheel switch is kept in the ON-status by the drive keeping circuit, this can be stopped. Hence, the release of the energy accumulated in the choke coil L is cut off, and an increase in quantity of the electric current can be prevented.

According to a seventh aspect of the invention, the DC-DC converter according to the sixth aspect further comprises a comparing circuit for detecting and comparing a voltage corresponding to an output of the transformer with a threshold, and supplying the fly wheel converter a signal indicating a result of the comparison.

According to a seventh aspect of the invention, there declines the voltage corresponding to the output stopping time of the transformer for the duration of the oscillation-stopped state of the DC-DC converter, and, if this voltage decreases under the threshold value, the comparing circuit outputs the signal indicating the compared result to the fly wheel switch. Then, the fly wheel switch is turned OFF, and the release of the energy accumulated in the choke coil is cut off.

According to an eighth aspect of the invention, the DC-DC converter according to the sixth aspect further comprises a clamp circuit for restraining an inter-channel voltage of the fly wheel switch kept in an OFF-status under a predetermined value.

According to an eighth aspect of the invention, the fly wheel switch is turned OFF, and the release route of the energy accumulated in the choke coil L is cut off. Then, even when a large voltage is to be applied to the channel of the fly wheel switch, the voltage is restrained under the predetermined value by the clamp circuit, thereby protecting the fly switch.

According to a ninth aspect of the invention, the clamp circuit according to the eighth aspect includes a Zener diode connected in parallel to the fly wheel switch.

According to a ninth aspect of the invention, when the inter-channel voltage of the fly wheel switch reaches a Zener voltage, the energy accumulated in the choke coil L is released via the Zener diode, and hence the inter-channel voltage of the fly wheel switch is restrained under the Zener voltage.

According to a tenth aspect of the invention, the clamp circuit according to the eighth aspect restrains the inter-channel voltage of the fly wheel switch under a voltage value of a constant voltage source.

According to a ninth aspect of the invention, when the inter-channel voltage of the fly wheel switch exceeds the voltage value of the constant voltage source, the energy is released toward the constant voltage source, and consequently the inter-channel voltage of the fly wheel switch is restrained under the voltage value of the constant voltage source.

According to an eleventh aspect of the invention, the DC-DC converter according to the ninth aspect further comprises a saturable reactor connected in series to the fly wheel switch.

According to an eleventh aspect of the invention, when the rectifying switch is not turned OFF immediately after the fly wheel switch has been turned ON. If there occurs a period for which the two switches are brought into the ON-status, the electric current, which will flow to the channel of the fly wheel switch, is hindered, thereby preventing the electric current over the rated range from flowing to the switch.

According to a twelfth aspect of the invention, the clamp circuit according to the eleventh aspect includes a diode disposed in series with the Zener diode and having a cathode connected to a cathode of the Zener diode.

According to the twelfth aspect of the invention, during a period till the electric current flows to the channel after the fly wheel switch has been turned ON, the electric current that is to flow in the forward direction of the Zener diode is hindered by the diode, and it is therefore feasible to restrain a power loss occurring in the Zener diode.

According to a thirteenth aspect of the invention, the DC-DC converter according to the second aspect further comprises a driving voltage control circuit for making the voltage being applied to the control terminal of the fly wheel switch fall within an upper limit and a lower limit of a rated range.

According to the thirteenth aspect of the invention, the voltages at the control terminal of the fly wheel switch is restrained within the rated values, and the oscillations of the control terminal voltage are absorbed.

According to a fourteenth aspect of the invention, the driving voltage control circuit according to the twelfth aspect restrains, under a voltage value of the constant voltage source, a value of the voltage applied to the control terminal of the fly wheel switch.

According to the fourteenth aspect of the invention, the voltage at the control terminal of the fly wheel switch oscillates, and, if over the voltage value of the constant voltage source, there is formed a current path extending from the control terminal of the fly wheel switch to the constant voltage source, whereby the voltage value at the control terminal is restrained under the voltage value of the constant voltage source.

According to a fifteenth aspect of the invention, the driving voltage control circuit according to the thirteenth aspect holds an output generated in the transformer and supplies the output to the control terminal of the fly wheel switch.

According to the fifteenth aspect of the invention, the driving voltage control circuit outputs, to the control terminal of the fly wheel switch, the voltage corresponding to the held output electric power of the transformer. When the output on the positive polarity side is supplied, the voltage value at the control terminal is restrained under the output voltage of the driving voltage control circuit. When the output on the negative polarity side is supplied, the voltage value at the control terminal is kept over the output voltage of the driving voltage control circuit.

According to a sixteenth aspect of the invention, the DC-DC converter according to the second aspect turns OFF the fly wheel switch when the output value to the load is smaller than the threshold.

According to the sixteenth aspect of the invention, if there decreases the output of any one of the plurality of synchronous rectifying type DC-DC converters in the process of being operated in parallel, and if there might be lead output currents of other DC-DC converters, the fly wheel switch is turned OFF. Hence, the lead currents do not flow on the side of the transformer. Accordingly, the electric current is not regenerated on the primary side of the transformer, and the circuit existing on the primary side of the transformer is protected.

According to seventeenth aspect of the invention, the DC-DC converter according to the second aspect turns OFF the fly wheel switch when the output of the transformer is smaller than the threshold.

According to the seventeenth aspect of the invention, in any one of the plurality of synchronous rectifying type DC-DC converters in the process of being operated in parallel, there occurs a decline in the output to the load with which the output decline of the transformer is concomitant, and, even if there might be the sneak output currents of other DC-DC converters, the fly wheel switch is turned OFF. Consequently, the leak currents do not flow on the side of the transformer. Hence, the electric current is not regenerated on the primary side of the transformer, thereby protecting the circuit existing on the primary side of the transformer.

According to the synchronous rectifying type DC-DC converter of the present invention, when the plurality of DC-DC converters are operated in parallel, the input to any one of the DC-DC converters is stopped, whereby the DC-DC converter concerned can be prevented from being damaged.

BRIEF DESCRIPTION OF THE DRAWINGS

FIG. 3 is a diagram showing a construction of the synchronous rectifying type DC-DC converter in a third embodiment;

DESCRIPTION OF THE PREFERRED EMBODIMENTS

Embodiments of the present invention will hereinafter be described with reference to the accompany drawings.

Figure 1:
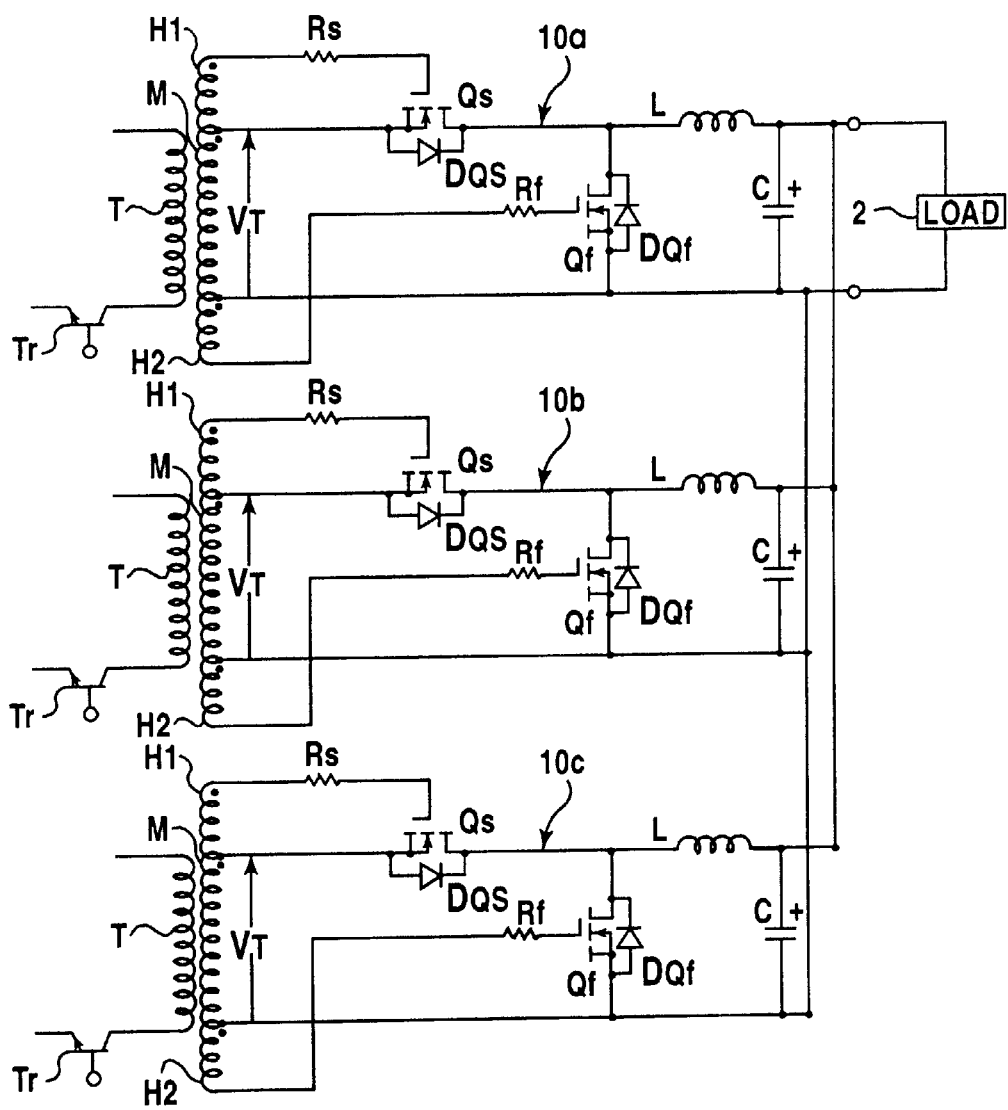
FIG. 1 is a diagram showing a construction of a synchronous rectifying type DC-DC converter in a first embodiment.

FIG. 1 is a diagram showing a circuit construction of a synchronous rectifying type DC-DC converter (hereinafter simply referred to as a "converter") in a first embodiment. Referring to FIG. 1, converters 10a, 10b, 10c are connected in parallel with a load 2. Herein, each of the converters 10a, 10b, 10c has the same construction, and hence the converter 10a will be exemplified.

Circuit Construction of Converter 10a

A transformer T is provided on an input side of the converter 10a. A switching transistor Tr is provided on a primary side of the transformer T. The switching transistor Tr intermittently supplies the converter 10a with electric power generated on the primary side of the transformer T by repeating ON/OFF operations.

A source of an n-channel enhancement type MOS-FET (hereinafter simple referred to as a "FET") Qs is connected to one terminal of a secondary winding M of the transformer T. A drain of the FET Qs is connected to one terminal of a choke coil L. The other terminal of the choke coil L is connected to an output terminal of the converter 10a.

Further, one terminal of an auxiliary winding H1 is connected to one terminal of the secondary winding M. The other terminal (hereinafter simply called a "first output terminal") of the auxiliary winding H1 is connected to one terminal of a resistance Rs. The other terminal of the resistance Rs is connected to a gate of the above-described FET Qs. The FET Qs equivalently has a parasitic diode DQs through which to connect a source with a drain thereof, and through which a direction from the source to the drain is set as a forward direction. A drain of an FET Qf is connected to a conductor for connecting the drain of the FET Qs to one terminal of the choke coil L. A source of the FET Qf is connected via the conductor to the other terminal of the secondary winding M. Further, the other terminal of the secondary winding M is connected to one terminal of an auxiliary winding H2. The other terminal (hereinafter termed a "second output terminal") of the auxiliary winding H2 is connected to one terminal of a resistance Rf. The other terminal of the resistance Rf is connected to a gate of the FET Qf. The FET Qf equivalently has a parasitic diode through to connect a source with a drain thereof, and through which the direction from the source to the drain is set as a forward direction.

Moreover, posterior to the choke coil L, a smoothing capacitor C is connected in parallel with the secondary winding M. Then, an output terminal of the converter 10a is connected to a load 2 (e.g., a CPU (Central Processing Unit) of a personal computer, etc). Further, an output terminal of each of the converters 10b, 10c is connected with the output terminal of the converter 10a.

The auxiliary winding H1 and the auxiliary winding H2 correspond to the auxiliary winding of the present invention.

Operation of DC-DC Converter

Figure 11B:
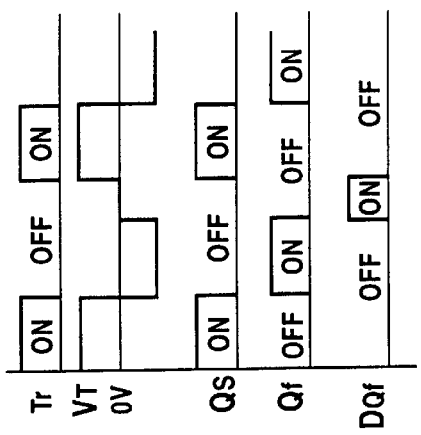
FIG. 11 is a diagram showing a construction of a prior art synchronous rectifying type DC-DC converter.
Figure 11A:
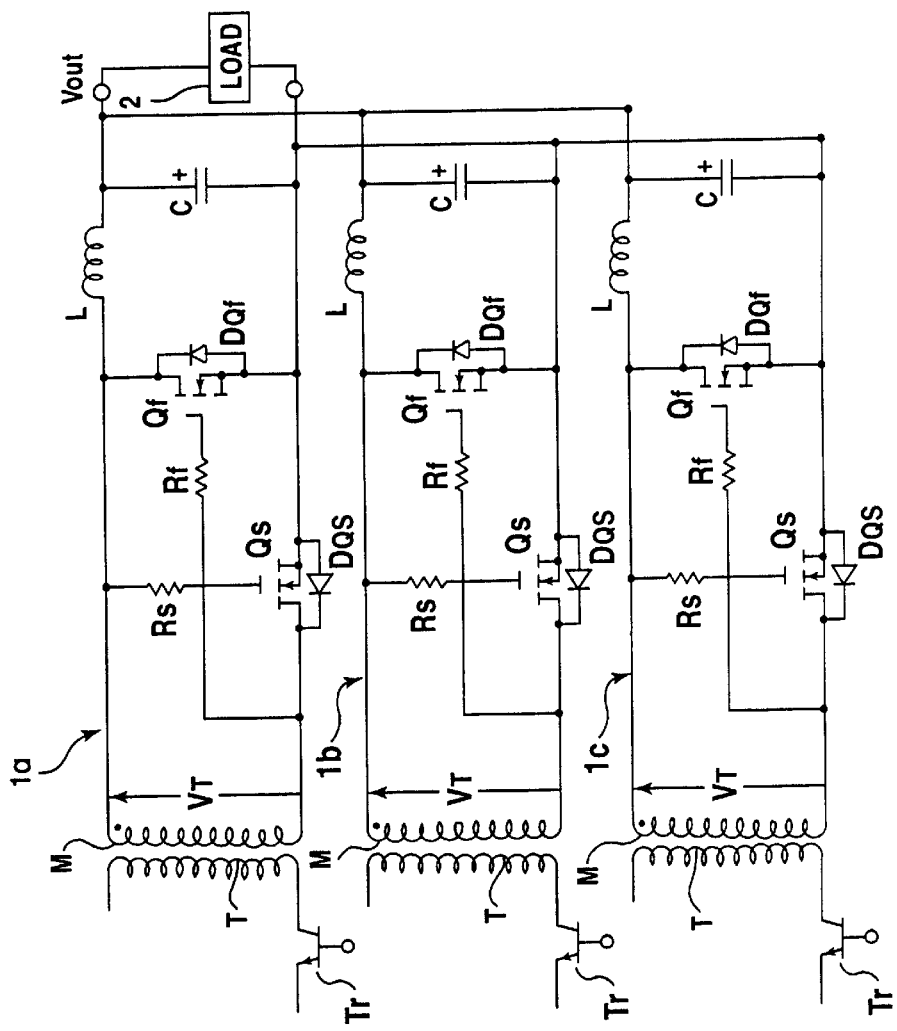

Next, an operation of each of the converters 10a, 10b, 10c shown in FIG. 1 will hereinafter be explained. The converters 10a, 10b, 10c, however, perform the same operation, and therefore the operation of the converter 10a is exemplified. Note that the operation of the converter 10a is much the same as the operation of the converter 1a illustrated in FIG. 11(a) and hence explained with reference to FIG. 11(b).

A voltage is generated on the primary winding of the transformer T in accordance with the ON/OFF statues of the switching transistor Tr. A positive voltage (Tr: ON-status) and a negative voltage (Tr: OFF-status) are alternately generated as a voltage VT with a given magnitude and a given period on the secondary winding M of the transformer T (see FIG. 11(b)). It shall be, however, assumed that the voltage be positive when an electric potential at one terminal of the secondary winding M is higher than an electric potential at the other terminal thereof, and be negative when the electric potential at one terminal of the secondary winding M is less than the one at the other terminal thereof.

Herein, it is presumed that the voltage is generated on the primary winding of the transformer T, and that the positive voltage VT is generated on the secondary winding M. Thereupon, the positive voltage is produced at the first output terminal of the auxiliary winding H1. This voltage is applied via the resistance Rs to the gate of the FET Qs. Then, a gate/source voltage (hereinafter simple called a "gate voltage") rises, and the FET Qs is turned ON.

Hereupon, an electric current flows from the drain of the FET Qs to the choke coil L. Then, the FET Qs is kept ON, during which an energy is accumulated in the choke coil L. Further, the smoothing capacitor C is charged with the electric charge. The smoothed DC voltage is thereby supplied to the load 2.

Thereafter, a polarity of the voltage VT generated on the secondary winding M changes from positive to negative, at which time the gate voltage of the FET Qs decreases with the result that the FET Qs is turned OFF. Further, the polarity of the voltage VT changes from positive to negative, and the positive voltage is thereby generated at the second output terminal of the auxiliary winding H2. This positive voltage is applied via the resistance Rf to the FET Qf. Then, the gate voltage of the FET Qf rises, whereby the FET Qf is turned ON. Thus, the FET Qf is turned ON substantially simultaneously with the turn-OFF of the FET Qs.

Upon the turn-OFF of the FET Qs, the energy accumulated in the choke coil L is released during the ON-status of the FET Qs. The electric current thereby flows through a closed circuit consisting of the choke coil L, the load 2 and the FET Qf.

Thereafter, the transformer T is magnetically reset, the generation of the negative voltage VT stops, and the voltage produced on the secondary winding M comes to "0". Thereupon, the gate voltage of the FET Qf decreases with the result that the FET Qf is turned OFF, and a resistance value of the parasitic diode DQf becomes less than a resistance value between the source and the drain of the FET Qf. The electric current thereby flows through a closed circuit consisting of the choke coil L, the load 2 and the parasitic diode DQf.

Thereafter, the voltage is applied across the primary winding of the transformer T, whereby the positive voltage VT is again generated on the secondary winding M and the positive voltage is generated at the first output terminal of the auxiliary winding H1. Then, the FET Qs is turned ON. A polarity of an anode/cathode voltage of the parasitic diode DQf becomes a reverse, and, hence, no electric current flows to this parasitic diode DQf with the result that the parasitic diode DQf is turned OFF. Hereafter, the operation described above is to be repeatedly carried out.

Thus, the converter 10a switches ON/OFF the FET Qs and the FET Qf synchronizing with the change in the polarity of the voltage VT from positive to negative. The substantially fixed commutated DC voltage is thereby supplied with the load 2.

The respective converters 10a, 10b, 10c are operated in parallel, and the output each converter is supplied to the load 2 via the output terminal of the converter 10a. At this time, if there halt oscillations (the generation of the voltage VT) of any one of the converters 10a, 10b, 10c, each of the converters 10a, 10b, 10c operates in the following manner:

For example, if the oscillations of the converter 10a stop, electric currents outputted from the normal converters 10b, 10c attempt to flow to between the drain and the source of the FET Qs via the choke coil L of the converter 10a. The currents are hindered, because the FET Qs remains OFF, and the parasitic diode DQs having a rectifying characteristic in the direction opposite to the current direction.

Similarly, electric currents outputted from the normal converters 10b, 10c attempt to flow to between the drain and the source of the FET Qf via the choke coil L. The currents are hindered by the parasitic diode DQf, because the parasitic diode DQf having the rectifying characteristic in the direction opposite to the current direction, the conduction thereof is hindered.

Therefore, the voltage is not applied to each of the gates of the FET Qs and of the FET Qf, and it follows that the FET Qs and the FET Qf are not turned ON. Accordingly, a large quantity of electric current is prevented from flowing into the converter 10a.

As discussed above, according to the converter 10a in the first embodiment, the electric current flowing into the converter 10a is prevented from flowing far into the respective gates of the FET Qs and FET Qf and from turning ON the FET Qs or FET Qf. Therefore, a deficiency of the electric current supplied to the load 2 is prevented, and damages to the FET Qs and FET Qf are also prevented.

Next, a second embodiment of the present invention will be discussed. In each of the converters 10a, 10b, 10c in the first embodiment discussed above, as shown in FIG. 11(b), the transformer T is magnetically reset and the voltage VT comes to "0", during which the FET Qf is turned OFF while the parasitic diode DQf is turned ON. When the parasitic diode DQf is turned ON, however, a voltage drop between the anode and the cathode of the parasitic diode DQf might become larger than needed and, hence, this results in such a problem that the loss increases.

Figure 2B:
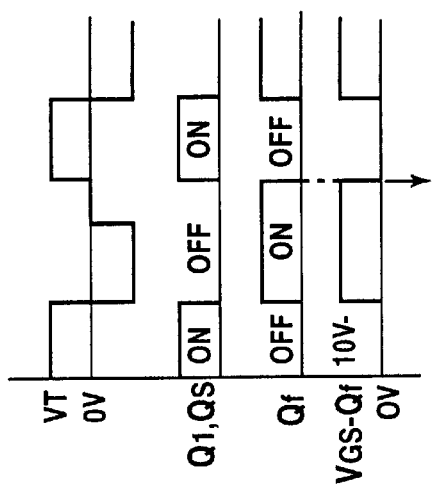
FIG. 2 is a diagram showing a construction of the synchronous rectifying type DC-DC converter in a second embodiment.
Figure 2C:
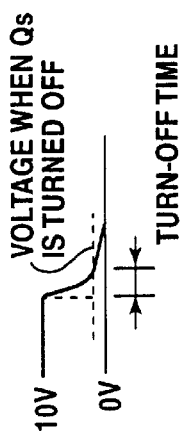
Figure 2A:
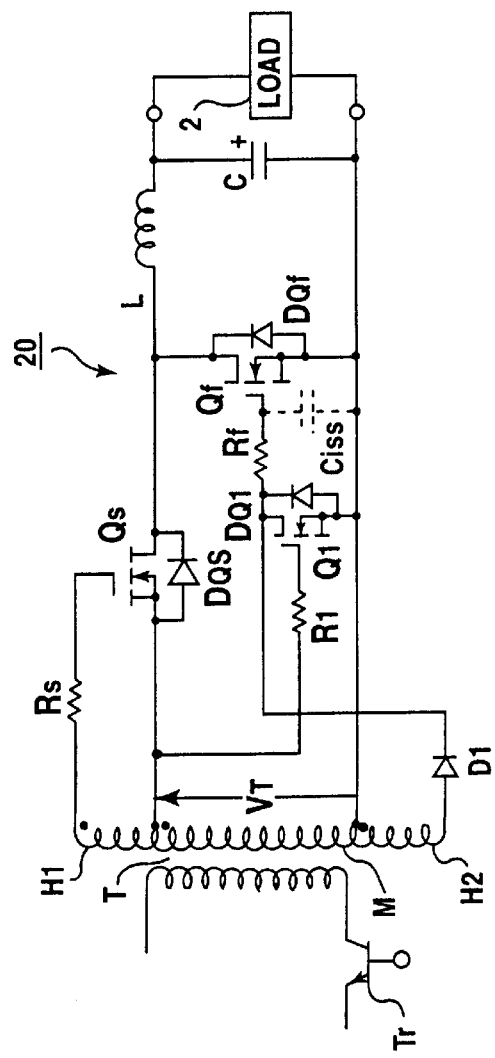

The second embodiment is contrived to obviate the problem inherent in the first embodiment. FIG. 2(a) is a diagram showing a circuit construction in a converter 20 in accordance with the second embodiment. FIG. 2(b) is a time chart showing an operation of the circuit element illustrated in FIG. 2(a). FIG. 2(c) is a partially enlarged diagram of the time chart shown in FIG. 2(b).

Circuit Construction of Converter 20

Referring to FIG. 2(a), the transformer T is provided on an input side of the converter 20. The source of the FET Qs is connected to one terminal of the secondary winding M of the transformer T. One terminal of the choke coil L is connected to the drain of the FET Qs. Then, the output terminal of the converter 20 is connected to the other terminal of the choke coil L.

Further, one terminal of the auxiliary winding H1 is connected to one terminal of the secondary winding M. The other terminal (hereinafter simply called the "first output terminal") of the auxiliary winding H1 is connected to one terminal of the resistance Rs. The other terminal of the resistance Rs is connected to the gate of the above-described FET Qs. This FET Qs equivalently has the parasitic diode DQs through which to connect the source with the drain thereof, and through which the direction from the source to the drain is set as the forward direction.

The drain of the FET Qf is connected to the conductor for connecting the drain of the FET Qs to one terminal of the choke coil L. The source of the FET Qf is connected via the conductor to the other terminal of the secondary winding M. Further, the other terminal of the secondary winding M is connected to one terminal of the auxiliary winding H2. The other terminal (hereinafter termed the "second output terminal") of the auxiliary winding H2 is connected to an anode of a diode D1. A cathode of the diode D1 is connected to one terminal of the resistance Rf. The other terminal of the resistance Rf is connected to the gate of the FET Qf.

This FET Qf equivalently has a parasitic diode DQf through to connect the source with the drain thereof, and through which the direction from the source to the drain is set as a forward direction. Furthermore, the FET Qf equivalently has a capacitor Ciss (a capacity component) having its one terminal connected to the gate of the FET Qf and its other terminal connected to the source of the FET Qf. Note that a capacitor instead of the capacitor Ciss may also be externally connected between the gate and the source of the FET Qf.

Moreover, one terminal of the resistance R1 is connected to a conductor for connecting one terminal of the secondary winding M to the source of the FET Qs. The other terminal of this resistance R1 is connected to a gate of an FET Q1. A source of the FET Q1 is connected to a conductor for connecting the other terminal of the secondary winding M to the source of the FET Qs. Further, a drain of the FET Q1 is connected to a conductor for connecting a cathode of the diode D1 to one terminal of the resistance R1. This FET Q1 equivalently includes a parasitic diode DQ1 through which to connect a source to a drain thereof, and through which the direction from the source to the drain is set as a forward direction.

Moreover, posterior to the choke coil L, the smoothing capacitor C is connected in parallel to the secondary winding M. Then, the output terminal of the converter 20 is connected to the load 2.

The diode D1 and the FET Q1 correspond to the drive keeping circuit of the present invention. The capacitor Ciss is the accumulating means of the present invention. The FET Q1 corresponds to the discharging switch of the present invention.

Operation of Converter 20

An operation of the converter 20 will hereinafter be explained. Namely, the positive voltage and the negative voltage are, in the same way as the first embodiment, alternately generated as the voltage VT with a given magnitude and a given period on the secondary winding M of the transformer T in accordance with the voltage application to the primary winding of the transformer T (see FIG. 2(b)).

Herein, it shall be assumed that the voltage VT in the positive direction be generated on the secondary winding M upon applying the voltage to the primary winding of the transformer T. At this time, the positive voltage is produced at the first output terminal of the auxiliary winding H1. This voltage is applied to the gate of the FET Qs via the resistance Rs. Thereupon, the gate voltage of the FET Qs rises with the result that the FET Qs is turned ON. Further, when the FET Qs is turned ON, the FET Q1 is also turned ON.

The FET Q1 is kept ON, during which the energy is accumulated in the choke coil L, and the smoothing capacitor C is charged with the electric charge. The load 2 thereby receives the substantially fixed smoothed DC voltage as an output of the converter 20.

Thereafter, the polarity of the voltage VT generated on the secondary winding M changes from positive to negative, at which time the gate voltage of the FET Qs decreases with the result that the FET Qs is turned OFF. Further, the FET Q1 is also turned OFF. Moreover, the polarity of the voltage VT changes from positive to negative, and the positive voltage is thereby generated at the second output terminal of the auxiliary winding H2. This positive voltage is applied via the diode D1 and the resistance Rf to the gate of the FET Qf.

The FET Qf is thereby turned ON. Thus, the FET Qf is turned ON substantially alternately to the OFF-status of the FET Qs. At this time, the electric charges are accumulated in the capacitor Ciss of the FET Qf.

When the FET Qs is turned OFF, the energy accumulated in the choke coil L during the ON-status of the FET Qs, is released. The electric current thereby flows to the closed circuit consisting of the choke coil L, the load 2 and the FET Qf.

Thereafter, the transformer T is magnetically reset, and, when the generation of the negative voltage VT stops (the voltage VT comes to "0"), there stops the positive applied voltage to the FET Qf from the second output terminal of the auxiliary winding H2. Since the electric charges are accumulated in the capacitor Ciss of the FET Qf, however, the electric potential between the capacitor Ciss and the gate of the FET Qf remains higher than the voltage between the source of the FET Qf and the source of the FET Q1.

The electric charges accumulated in this capacitor Ciss try to flow in a lower-potential direction. However, the direction of the diode D1 and of the diode DQ1 is opposite to the flow of current, and, the FET Qf being kept OFF, the flow of current is therefore hindered. Consequently the gate voltage of the FET Qf is kept at the ON level. Accordingly, the FET Qf is not turned ON, and the parasitic diode DQf is not turned ON.

Thereafter, upon applying the voltage to the primary winding of the transformer T, the positive voltage VT is again generated on the secondary winding M, and the positive voltage is produced at the first output terminal of the auxiliary winding H1, at which time the FET Qs is turned ON. Further, the FET Q1 is turned ON with the generation of the positive voltage VT. Then, the electric charges accumulated in the capacitor Ciss are discharged through the resistance Rf and the FET Q1 in accordance with a time constant determined by a capacity of the capacitor Ciss and a value of the resistance Rf.

Thereupon, the gate voltage of the FET Qf decreases, and the FET Qf is turned OFF. Then, the FET Qs is turned ON, whereby the energy is again accumulated in the choke coil L. Hereinafter, the converter 20 repeats the operation described above.

According to the converter 20 in the embodiment 2, the transformer T is magnetically reset, and the voltage VT becomes "0". Even in such a case, the FET Qf is kept in the ON-status. Hence, there is prevented an occurrence of loss upon the turn-ON of the parasitic diode DQf as in the case of the conventional converter 1a and the converter 10a in the first embodiment.

Next, a third embodiment of the present invention will be explained. In the converter 20 in the second embodiment discussed above, the parasitic diode DQf is prevented from being turned ON by the diode D1 hindering the electric charges in the capacitor Ciss from being discharged. Then, the FET Q1 is turned ON simultaneously with the turn-ON of the FET Qs, thereby discharging the electric charges in the capacitor Ciss and thus turning OFF the FET Qf.

Incidentally, in the converter 20 in the second embodiment, a gate voltage (a voltage VGS-Qf in FIG. 2(c)) of the FET Qf is controlled by a rectangular wave of, e.g., 0–10V, thereby driving the FET Qf. Then, in view of a MOS-FET being used as a gate of a TTL (Transistor Transistor Logic), an ON/OFF threshold is set in the vicinity of 2V. A rise of the gate voltage of the FET Qf, however, depends on a transient phenomenon based on the capacitor Ciss and the resistance Rf, and hence, as shown in FIG. 2(c) the gate voltage gently decreases as it approaches "0" and finally becomes "0".

Accordingly, in the converter 20 in accordance with the second embodiment, there must be a long time till the gate voltage of the FET Qf decreased under the ON/OFF threshold since the positive voltage VT was produced in the transformer T, i.e., a turn-OFF time becomes long, resulting in such a problem that switching loss augments.

The third embodiment is contrived to obviate the problem peculiar to the converter 20 in the second embodiment. FIG. 3(a) is a diagram showing a circuit construction of a converter 30 in the third embodiment. FIG. 3(b) is a time chart showing an operation of the circuit element illustrated in FIG. 3(a). FIG. 3(c) is a partially enlarged diagram of the time chart shown in FIG. 3(b).

Circuit Construction of Converter 30

Referring to FIG. 3(a), the transformer T is provided on an input side of the converter 30, and an output terminal of the converter 30 is connected to the load 2. One terminal of the secondary winding M of the transformer T is connected to the source of the FET Qs via a conductor. The drain of the FET Qs is connected to one terminal of the choke coil L via the conductor. Then, the other terminal of the choke coil L is connected to the output terminal of the converter 20.

One terminal of the auxiliary winding H1 is connected to one terminal of the secondary winding M of the transformer T. The other terminal (hereinafter simply called the "first output terminal") of the auxiliary winding H1 is connected to one terminal of the resistance Rs. The other terminal of the resistance Rs is connected to gate of the above-described FET Qs. This FET Qs equivalently has the parasitic diode DQs through which to connect the source with the drain thereof, and through which the direction from the source to the drain is set as the forward direction.

One terminal of the smoothing capacitor C is connected to the other terminal of the choke coil L. The other terminal of the smoothing capacitor C is connected to the other terminal of the secondary winding M via the conductor. Then, the gate of the FET Q11 is connected via the resistance R11 to the conductor for connecting the other terminal of the smoothing capacitor C to the other terminal of the secondary winding M.

An auxiliary winding H2 is connected to the other terminal of the secondary winding M. The other terminal (hereinafter called the "second output terminal") of the auxiliary winding H2 is connected via the conductor to the source of the FET Q11. Then, the drain of the FET Q11 is connected via the resistance Rf to the gate of the FET Qf. The FET Q11 equivalently has a parasitic diode DQ11 through to connect the source with the drain thereof, and through which the direction from the source to the drain is set as a forward direction.

The source of the FET Qf is connected to the conductor for connecting the other terminal of the secondary winding M to the other terminal of the smoothing capacitor C. The drain of the FET Qf is connected to the conductor for connecting the drain of the FET Qs to one terminal of the choke coil L. This FET Qf equivalently has the parasitic diode DQf through which to connect the source and the drain thereof, and through which the direction from the source to the drain is set as a forward direction. Furthermore, the FET Qf equivalently has the capacitor Ciss (the capacitor component) having its one terminal connected to the gate of the FET Qf and its other terminal connected to the source of the FET Qf.

The FET Q11 corresponds to the discharging switch of the present invention.

Operation of Converter 30

An operation of the converter 30 described above will hereinafter be explained. That is, the positive voltage and the negative voltage are, in the same way as the first embodiment, alternately generated as the voltage VT with a given magnitude and a given period on the secondary winding M of the transformer T in accordance with the voltage application to the primary winding of the transformer T (see FIG. 3(b)).

Herein, it shall be assumed that the voltage VT be generated on the secondary winding M upon applying the voltage to the primary winding of the transformer T. At this time, the positive voltage is produced at the first output terminal of the auxiliary winding H1. This voltage is applied to the gate of the FET Qs. Thereupon, the FET Qs is turned ON, and subsequently to this the FET Q11 is also turned ON.

The FET Qs is kept ON, during which the energy is accumulated in the choke coil L, and the smoothing capacitor C is charged with the electric charge. The load 2 receives thereby the smoothed DC voltage as an output of the converter 30.

Thereafter, the polarity of the voltage VT generated on the secondary winding M changes from positive to negative, at which time the gate voltages of the FET Qs and of the FET Q11 decrease with the result that the FET Qs and the FET Q11 are turned OFF. Moreover, the polarity of the voltage VT changes from positive to negative, and the positive voltage is thereby generated at the second output terminal of the auxiliary winding H2. This positive voltage is applied via the parasitic diode DQ11 and the resistance Rf to the gate of the FET Qf. Then, the FET Qf is turned ON. At this time, the electric charges are accumulated in the capacitor Ciss of the FET Qf.

When the FET Qs is turned OFF, the energy accumulated in the choke coil L during the ON-status of the FET Qs, is released. The electric current thereby flows to the closed circuit consisting of the choke coil L, the load 2 and the FET Qf.

Thereafter, the transformer T is magnetically reset, and, when the generation of the negative voltage VT stops (the voltage VT comes to "0"), the gate voltage of the FET Qf is kept at the ON level by the positive voltage with which the capacitor Ciss of the FET Qf is charged. Accordingly, neither the FET Qf is turned OFF, nor the parasitic diode DQf is turned ON.

Thereafter, the positive voltage is gain produced on the secondary winding M by applying the voltage to the primary winding of the transformer T, and, simultaneously with this, the positive voltage is generated at the first output terminal of the auxiliary winding H1. Thereupon, the FET Qs again becomes ON. Further, the FET Q11 is also again turned ON. The negative voltage is thereby applied to the gate of the FET Qf, and hence the gate voltage of the FET Qf decreases toward a steady state of substantially −10V.

At this time, the electric charges in the capacitor Ciss are discharged via the resistance Rf and the FET Q11 in accordance with the time constant determined by the capacity of the capacitor Ciss and by the value of the resistance Rf. Herein the gate voltage of the FET Qf, because of the steady state being substantially −10V, decreases with a comparatively steep gradient in the vicinity of 2V (in the proximity to the ON/OFF threshold of the FET Qf). Accordingly, the FET Qf is turned OFF in a shorter period of OFF-time than in the second embodiment.

Then, the FET Qs is turned ON, whereby the energy is again accumulated in the choke coil L. Hereafter, the converter 30 repeats the operation described above.

According to the converter 30 in the third embodiment, a backward bias is applied to the gate of the FET Qf by turning ON the FET Q11, and therefore the gradient of the gate voltage in the vicinity of the ON/OFF threshold of the FET Qf becomes steeper than in the second embodiment. The turn-OFF time of the FET Qf becomes steeper than in the second embodiment. Hence, the switching loss can be reduced greater than in the second embodiment.

Further, according to the converter 30 in the third embodiment, the parasitic diode DQ11 performs the function of the diode D1 used in the second embodiment, and consequently there can be reduced a larger number of parts than in the converter 20 in the second embodiment.

Next, a fourth embodiment of the present invention will be described. According to the converter 20 in the second embodiment discussed above and the converter 30 in the third embodiment discussed above, when the oscillations thereof stop due to a breakdown, etc., or when the primary-side power supply of the transformer T is switched OFF, the FET Qf remains ON by the voltage with which the capacitor Ciss is charged.

Therefore, if the parallel operations are carried out, as in the first embodiment by use of, e.g., a plurality of converters 20, and if any one of the converters 20 stops oscillating, a large quantity of current generated from the normal converters 20 flows into the FET Qf of the converter 20 having stopped oscillating, and this FET Qf might be damaged. This problem is common to such a case that the parallel operations are conducted as in the first embodiment by using a plurality of converters 30.

Figure 4B:
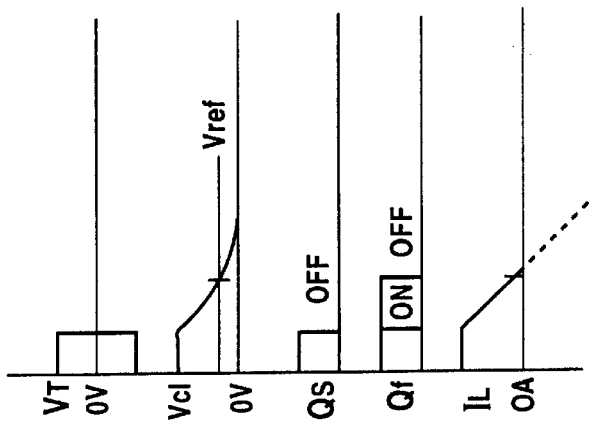
FIG. 4 is a diagram showing a construction of the synchronous rectifying type DC-DC converter in a fourth embodiment.
Figure 4A:
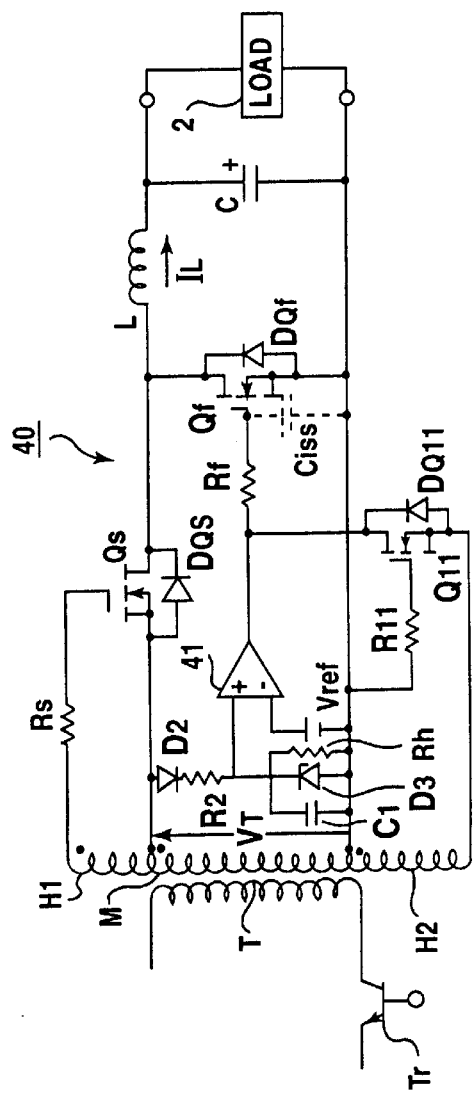

The fourth embodiment is contrived to obviate the problem given above. FIG. 4(a) is a diagram showing a circuit construction of a converter 40 in the fourth embodiment. FIG. 4(b) is a time chart showing an operation of the circuit element illustrated in FIG. 4(a). The converter 40 in the fourth embodiment is, however, constructed by adding new components to the converter 30 described above. Therefore, the explanations of the common components are omitted, and only the new components will be explained.

Circuit Construction of Converter 40

Referring to FIG. 4(a), an anode of a diode D2 is connected to a conductor for connecting one terminal of the secondary winding M of the transformer T to the source of the FET Qs. A cathode of the diode D2 is connected to one terminal of a resistance R2. The other terminal of the resistance R2 is connected to one terminal of the capacitor C1, a cathode of a Zener diode D3, one terminal of a resistance Rh and a non-inversion input terminal of a comparator 41.

Further, the other terminals of the capacitor C1 described above, the Zener diode D3 and the resistance Rh are connected to a conductor for connecting the other terminal of the secondary winding M to the other terminal of the smoothing capacitor C. Then, an inversion-input terminal of the comparator 41 is connected to the above conductor through a constant voltage source for generating a reference voltage Vref. Then, an output terminal of the comparator 41 is connected to the gate of the FET Qf via the resistance Rf.

Herein, the capacitor C1 is charged with a voltage Vc1 inputted to the comparator 41. Further, the Zener diode D3 causes a voltage breakdown when the voltage Vc1 of the capacitor C1 rises above a predetermined value, thus restraining the voltage Vc1 of the capacitor C1 down to the predetermined value. The diode D2 hinders the electric charges in the capacitor C1 from being discharged on the side of one terminal of the secondary winding M. Moreover, the resistance Rh is a resistance for discharging the capacitor C1.

The comparator 41 is constructed by use of an operational amplifier. This comparator 41 compares the voltage Vc1 inputted from the non-inversion input terminal thereof with the resistance voltage Vref inputted from the inversion input terminal thereof, and, if the voltage Vc1 is lower than the resistance voltage Vref, outputs a negative voltage.

The diode D2, the resistance R2, the capacitor C1, the Zener diode D3, the resistance Rh and the comparator 41 correspond to the drive stopping circuit of the present invention. The comparator 41 corresponds to the comparing circuit of the present invention.

Operation of Converter 40

An operation of the converter 40 described above will hereinafter be explained. The operation of the converter 40 is, however, partially common to the operation of the converter 30, and therefore mainly a different operation from the converter 30 will be explained. The positive voltage and the negative voltage are, in the same way as the third embodiment, alternately generated as the voltage VT with a given magnitude and a given period on the secondary winding M of the transformer T in accordance with the voltage application to the primary winding of the transformer T.

Herein, it shall be assumed that the positive voltage VT be generated on the secondary winding M upon applying the voltage to the primary winding of the transformer T. At this time, the capacitor C1 is charged with the positive voltage VT through the diode D2 and the resistance R2, and the voltage Vc1 produced by the electric charges given thereto is inputted to the comparator 41. At this moment, the voltage Vc1 inputted to the comparator 41 is restrained to the predetermined value by the Zener diode D3.

Thereafter, when the polarity of the voltage VT produced on the secondary winding M changes from positive to negative, the FET Qs and the FET Qf are turned OFF. Further, with the change in the polarity of the voltage VT from positive to negative, the positive voltage is generated at the second output terminal of the auxiliary winding H2. The FET Qf is thereby turned ON. At this time, the electric charges are accumulated in the capacitor Ciss.

When the FET Qs is turned OFF, the energy accumulated in the choke coil L during the ON-status of the FET Qs is released. An electric current IL thereby flows through a closed circuit consisting of the choke coil L, the load 2 and the FET Qf.

Herein, it is presumed that the oscillations of the converter 40 stop due to a breakdown, and that it comes to a state where no positive voltage is generated at the first output terminal of the auxiliary winding H1 while the voltage VT remains to be "0". Then, the FET Qs remains OFF, and the FET Qf is kept in the ON-status by the positive voltage with which the capacitor Ciss is charged.

On the other hand, the electric charges accumulated in the capacitor C1 are discharged via the resistance Rh, and the voltage Vc1 inputted to the comparator 41 gradually decreases. Then, the comparator 41, when the voltage Vc1 is lower than the reference voltage Vref, outputs the negative voltage. This negative voltage is applied to the gate of the FET Qf. The electric charges in the capacitor Ciss flows into the comparator 41 via the resistance Rf and are then discharged. As a result, the gate voltage of the FET Qf abruptly decreases, with the result that the FET Qf is turned OFF.

According to the converter 40 in the fourth embodiment, in the case of operating the plurality of converters 40 in parallel, any one of the converters 40 stops oscillating, and it comes to a state where the voltage VT is not produced on the secondary winding M for a predetermined period of time. Then, after an elapse of a predetermined time for which the capacity of the capacitor C1 is determined by an initial value of the voltage Vc1 and the value of the resistance Rh, the comparator 41 turns OFF the FET Qf. It is therefore feasible to prevent a large electric current from flowing into the converter 40 having stopped oscillating and the FET Qf of the converter 40 from being damaged.

Next, a fifth embodiment of the present invention will be discussed. In the case of using and operating the plurality of converters 40 in the embodiment 40, the voltage VT is not generated in any one of the converters 40, and the voltage VT continues to be in the "0" status for the predetermined time, in this converter 40 the transformer T sided electric potential becomes lower than the electric potential on the side of the load 2. Therefore, the electric current flows from other converter 40 via the choke coil L. As a measure taken for this current, in the converter 40, if the voltage VT continues to be in the "0" status for the predetermined time, the comparator 41 turns OFF the FET Qf.

If the FET Qf is in the OFF-state, however, the electric current flowing from other converter 40 has nowhere to go. Consequently, a large surge voltage is generated between the drain and the source of the FET Qf, and there exists a possibility that the FET Qf might be damaged. A possible contrivance for coping with this problem is that an absorber against the surge voltage is formed by providing a resistance and a capacitor anterior to the choke coil L. A loss may be caused because of providing the resistance and the capacitor, and hence there might be a possibility in which an efficiency of the converter 40 declines.

Figure 5B:
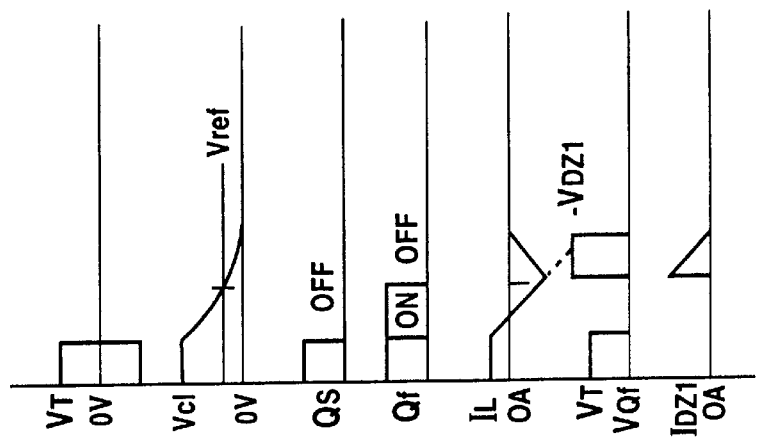
FIG. 5 is a diagram showing a construction of the synchronous rectifying type DC-DC converter in a fifth embodiment.
Figure 5A:
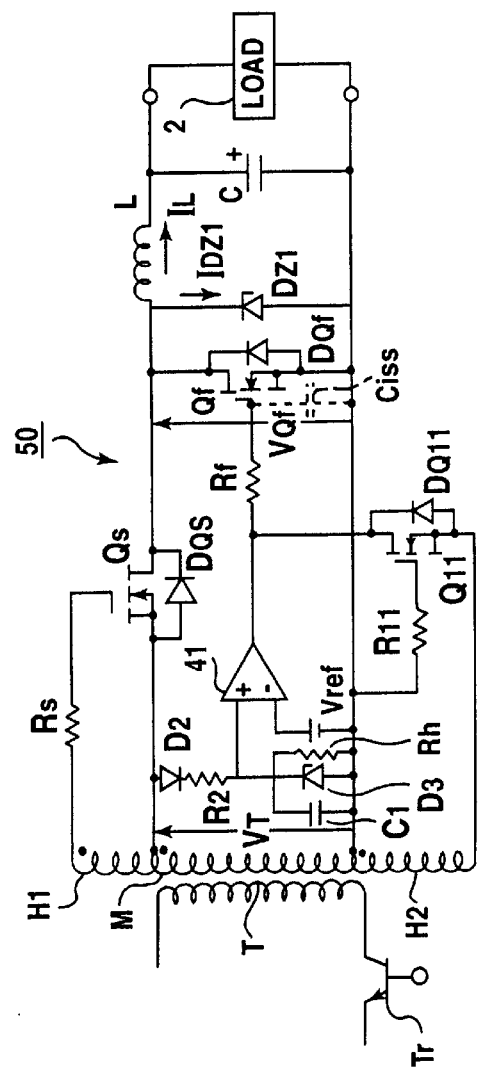

The fifth embodiment is contrived to obviate the problem described above. FIG. 5(a) is a diagram showing a circuit construction of a converter 50 in the fifth embodiment. FIG. 5(b) is a time chart showing an operation of the circuit element illustrated in FIG. 5(a). The converter 50 in the fifth embodiment is, however, constructed by adding new components to the converter 40 described above. Therefore, the common components are marked with the same numerals, and only the new components are explained while omitting the explanation about the common components.

<Circuit Construction of Converter 50>

Referring to FIG. 5(a), a cathode of a Zener diode DZ1 is connected to a conductor for connecting the drain of the FET Qs to one terminal of the choke coil L. An anode of this Zener diode DZ1 is connected to a conductor for connecting the other terminal of the secondary winding M of the transformer T to the other terminal of the smoothing capacitor C.

A forward-direction resistance of this Zener diode DZ1 is so constructed as to become larger than the resistance between the source and the drain of the FET Qf when the FET Qf is turned ON as well as being so constructed that the Zener diode DZ1 is not turned ON in the forward direction (anode→cathode).

The Zener diode DZ1 corresponds to the clamp circuit of the present invention.

<Operation of Converter 50>

An operation of the converter 50 described above will hereinafter be explained. The operation of the converter 50 is, however, partially common to the operation of the converter 40, and therefore mainly a different operation from the converter 40 will be explained. Given herein is an explanation of the operation of any one of the converters 50 when the plurality of converters 50 are operated in parallel.

The positive voltage and the negative voltage are, in the same way as the first embodiment, alternately generated as the voltage VT with a given magnitude and a given period on the secondary winding M of the transformer T in accordance with the voltage application to the primary winding of the transformer T.

Herein, it is assumed that any one of the converters 50 stops oscillating due to a breakdown when the voltage VT is "0" or a negative voltage, and that it comes to a state where, as shown in FIG. 5(*b*), the positive voltage VT is not generated. Then, the FET Qs of this converter remains OFF, and the FET Qf is kept in the ON-status by the positive voltage with which the capacitor Ciss is charged. On the other hand, the electric charges accumulated in the capacitor C1 are discharged via the resistance Rh, and the voltage Vc1 inputted to the comparator 41 gradually decreases. Then, the comparator 41, if the voltage Vc1 is lower than the reference voltage Vref, turns OFF the FET Qf.

Incidentally, any one of the converters 50 stops oscillating, whereby the current outputted from other converter 50 flows into the above converter 50 via the choke coil L. Namely, the electric current IL flowing through the choke coil L flows in a direction opposite to the direction at a normal time (see FIG. 5(*b*)). Thereupon, a voltage VDZ1 between the cathode and the anode of the Zener diode DZ1 rises. Then, when the voltage VDZ1 exceeds a predetermined Zener voltage, the Zener diode DZ1 causes a breakdown phenomenon, with the result that an electric current IDZ1 flows in a reverse direction (cathode→anode) across the Zener diode DZ1. Therefore, a voltage VQf between the drain and the source of the FET Qf does not increase.

According to the converter 50 in the fifth embodiment, when the flow of the current IL accumulated in the choke coil L is reversed, a breakdown of the Zener diode DZ1 occurs, and the electric current IDZ1 flows away to the other terminal of the secondary winding M. Consequently, the large surge voltage is produced in the FET Qf, and the large current flows into the FET Qf, thereby preventing the FET Qf from being damaged.

Further, the absorber against the surge voltage is formed by use of the Zener diode DZ1, and hence there is caused no loss due to the Zener diode DZ1 during the normal operation of the converter 50. Accordingly, the converter 50 is capable of supplying the load 2 with the substantially constant DC voltage at almost the same efficiency as the converter 40.

Figure 6:
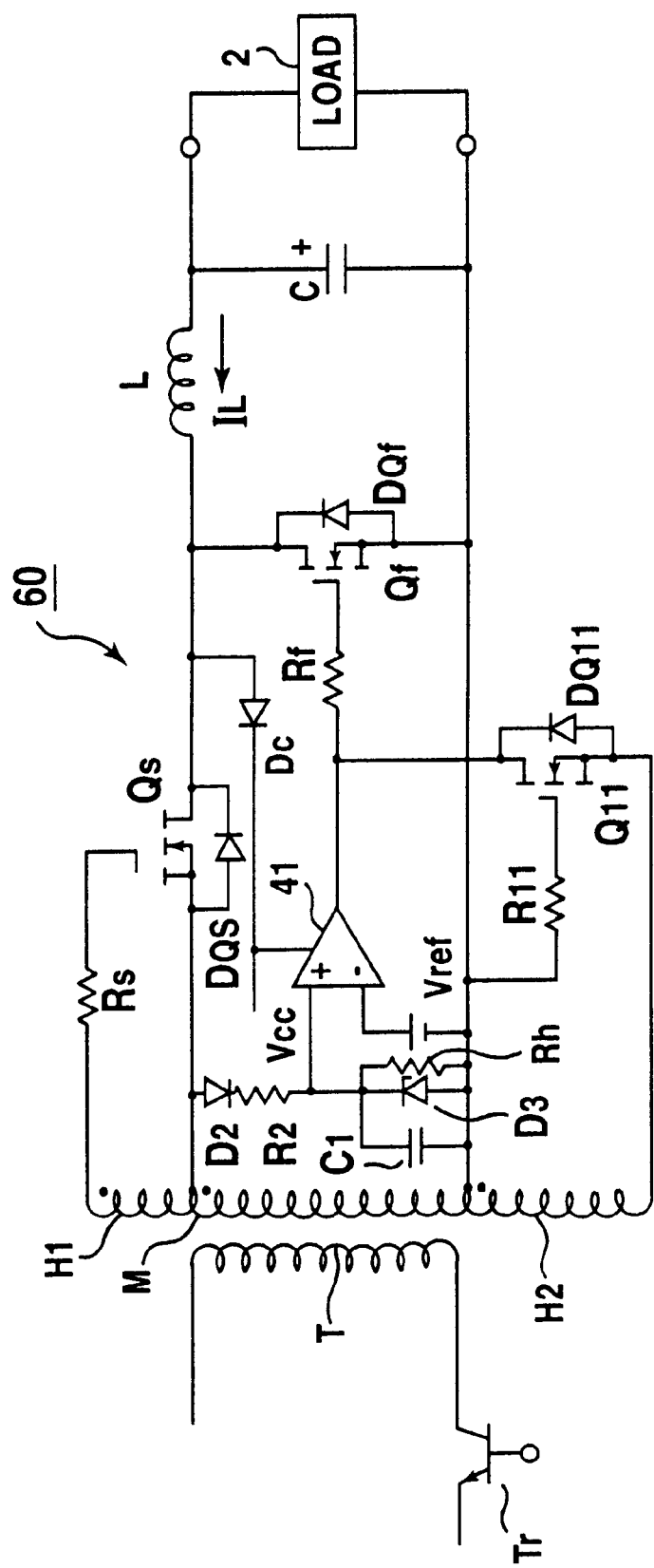
FIG. 6 is a diagram showing a construction of the synchronous rectifying type DC-DC converter in a sixth embodiment.

Next, a sixth embodiment of the present invention will hereinafter be discussed. FIG. 6 is a diagram showing a circuit construction of a converter 60 in the sixth embodiment. The converter 60 in the sixth embodiment is, however, constructed by adding new components to the converter 40 described above. Therefore, the common components are marked with the same numerals with an explanatory omission, and only the new components are explained.

<Circuit Construction of Converter 60>

Referring to FIG. 6, An anode of a diode Dc is connected to a conductor for connecting the drain of the FET Qs to one terminal of the choke coil L. A cathode of this diode Dc is connected to a constant voltage source from which to generate a driving voltage Vcc of the comparator 41. When the FET Qs is kept ON, the electric potential on the side of this diode Dc is set higher than the electric potential on the side of the choke coil L. With this setting, when the FET Qs is in the ON-status, the current is prevented from flowing toward the diode Dc.

<Operation of Converter 60>

An operation of the converter 60 shown in FIG. 6 will hereinafter be described. The operation of the converter 60 is, however, partially common to the operation of the converter 50, and mainly a different operation from the converter 50 is explained. Given herein is an explanation in the case of operating the plurality of converters 60 in parallel.

As described above, it is assumed that any one of the converters 60 stops oscillating, and that it comes to a state where the positive voltage VT is not produced. Thereupon, the FET Qs remains OFF, whereas the FET Qf is kept in the ON-status by the positive voltage with which the capacitor Ciss is charged. Then, when a predetermined time elapses, the FET Qf is turned OFF by the comparator 41.

On the other hand, because of any one of the converters 60 having stopped oscillating, the electric potential of this converter 60 becomes lower than the electric potentials of other converters 60. Therefore, from other converters 60, the electric currents flow via the choke coil L into the converter 60 having stopped oscillating.

The electric current IL in the direction opposite to the direction at the normal time flows through the choke coil L of the converter 60 having stopped oscillating. At this time, since the FET Qs and the FET Qf are in the OFF-status, the electric potential of the diode Dc is in the lowest state. Accordingly, the electric current IL flows to the constant voltage source from which to generate the driving voltage Vcc through the diode Dc. Consequently, a voltage VQf between the drain and the source of the FET Qf is clamped by the driving voltage Vcc, thereby preventing the generation of the surge voltage.

The effect of the converter 60 in the sixth embodiment is substantially the same as that of the converter 50 in the fifth embodiment. In addition, however, there must be such an advantage that the electric current flowed from other converter 60 is usable as the driving voltage Vcc of the comparator 41.

Next, a seventh embodiment of the present invention will be explained. A converter 70 in the seventh embodiment aims at improving the converter 50 (see FIG. 5) explained in the fifth embodiment. FIG. 7(*a*) is a diagram showing a circuit construction of a converter 70 in the embodiment 7. FIG 7(*b*) is a diagram showing a voltage waveform of the converter 70 illustrated in FIG. 7(*a*). The converter 70 is, however, constructed by adding new components to the converter 50. Therefore, the common components are marked with the same numerals with an explanatory omission, and only the new components will be explained.

<Circuit Construction of Converter 70>

Referring to FIG. 7(*a*), one terminal of a saturable reactor Ls is connected to the drain of the FET Qs. The other terminal of the saturable reactor Ls is connected to one terminal of the choke coil L via the conductor. One terminal of a saturable reactor Lf is connected to a conductor for connecting the other terminal of the saturable reactor Ls to one terminal of the choke coil L. The other terminal of the saturable reactor Lf is connected to the drain of the FET Qf.

Further, an anode of a diode Dd is connected to a conductor for connecting the other terminal of the saturable reactor Ls to one terminal of the choke coil L. A cathode of the diode Dd is connected to the cathode of the Zener diode DZ1. The cathode of the Zener diode DZ1 is connected to a conductor for connecting the other terminal of the secondary winding M of the transformer T to the other terminal of the smoothing capacitor C.

The saturable reactor Lf accumulates the electric current flowed from the drain of the FET Qf till a magnetic flux density thereof is saturated, and makes the current conductive when coming to a saturated state. Further, the saturable reactor Ls, when the FET Qs is turned ON, accumulates the electric current flowed from the drain of the FET Qs till its magnetic flux density is saturated, and makes the current conductive when reaching the saturated state.

What is herein implied is not that the FET Qs and the FET Qf of the converter 70 are simultaneously ON and OFF, but that there must be a period of time till the FET Qf is turned ON after the FET Qs has been turned OFF, or till the FET Qs is turned ON after the FET Qf has been turned OFF, i.e., a time for which the FET Qs and the FET Qf are simultaneously turned ON.

The saturable reactor Ls and the saturable reactor Lf prevent the electric current over the rated value from flowing to the source from the drain of the FET Qf during a period till the FET Qs is turned OFF after the FET Qf has been turned ON as well as preventing the electric current over the rated value from flowing to the source from the drain of the FET Qf during a period till the FET Qf is turned OFF after the FET Qs has been turned ON. The FET Qs or the FET Qf is thereby prevented from being damaged.

The diode Dd prevents an occurrence of loss caused by the Zener diode DZ1 turning ON in the forward direction (anode→cathode) during a period until a state is reached in which the saturable reactor Lf is saturated and makes conductive the electric current which has flowed from the drain of the FET Qf.

<Operation of Converter 70>

An operation of the converter 70 described above will hereinafter be explained. The operation of the converter 70 is, however, partially common to the operation of the converter 50, and therefore mainly a different operation from the converter 50 will be explained. The positive voltage and the negative voltage are, as shown in FIG. 7(b), alternately generated as the voltage VT with a given magnitude and a given period on the secondary winding M of the transformer T in accordance with the applied voltage to the primary winding of the transformer T.

Herein, it is assumed that the positive voltage VT be generated on the secondary winding M and that the voltage be generated at the first output terminal of the auxiliary winding H1 by applying the voltage to the primary winding of the transformer T. The FET Qs is thereby turned ON. Thereupon, the electric current flows from the drain of the FET Qs and is accumulated in the saturable reactor Ls. When the saturable reactor Ls is saturated, the electric current flows through the choke coil L.

Thereafter, the energy is accumulated in the choke coil during the ON-status of the FET Qs, and the smoothing capacitor C is charged with the electric charge. The load 2 receives thereby the fixed smoothed DC voltage as an output of the converter 70.

Figure 7B:
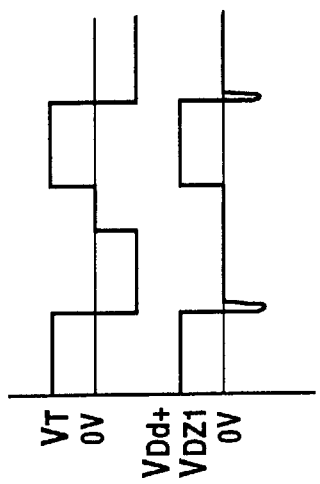
FIG. 7 is a diagram showing a construction of the synchronous rectifying type DC-DC converter in a seventh embodiment.
Figure 7A:
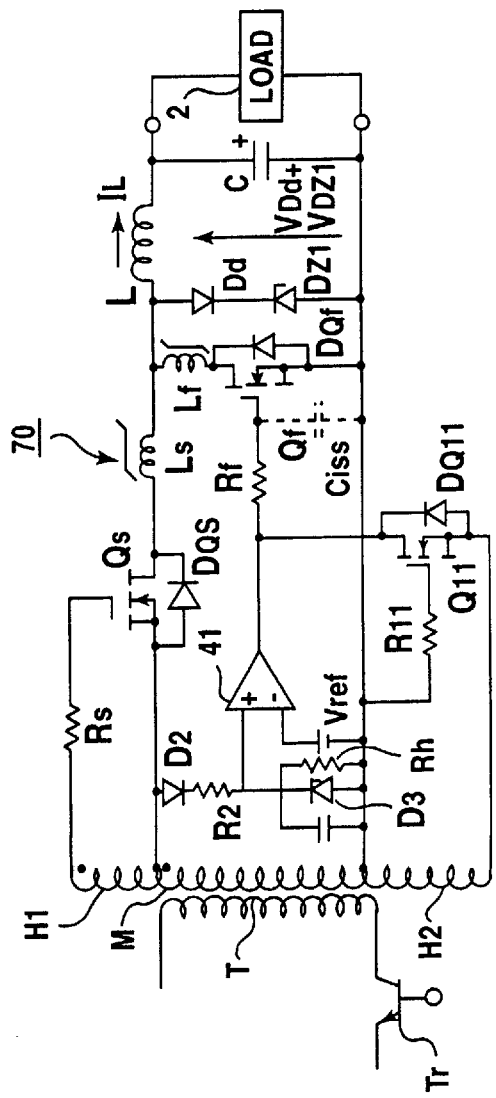

Further, the FET Qs is kept ON, during which a voltage (a voltage Vdd+VDZ1) ranging from the anode of the Zener diode DZ1 to the anode of the diode Dd is kept as a positive voltage having a predetermined value as shown in FIG. 7(b).

Thereafter, when the polarity of the voltage VT generated on the secondary winding M changes from positive to negative, the FET Qs is turned OFF. Then, the electric current IL based on the energy accumulated in the choke coil L flows into the saturable reactor Lf via the load 2 and the parasitic diode DQf. The saturable reactor Lf hinders the conduction of the electric current IL until the reactor Lf itself reaches the saturated state.

At this time, the voltage Vdd+VDZ1 becomes, as shown in FIG. 7(b), negative and reaches a state where the electric potential is lower than between the source and drain of the FET Qf. Therefore, Zener diode DZ1 is turned ON in the forward direction (anode→cathode) and acts to flow the electric current therethrough. The diode is, however, provided in the direction opposite to the flow of the electric current IL, and hence the electric current IL is hindered from flowing into the Zener diode DZ1.

Thereafter, the FET Qf is turned ON, and hereafter the saturable reactor f is saturated, whereby the voltage Vdd+ VDZ1 comes to substantially "0". Then, the electric current IL flows through the choke coil L, the load 2, the FET Qf and the saturable reactor Lf.

Then, the transformer T is magnetically reset, and the voltage VT on the secondary winding M becomes "0", at which time the FET Qf is kept in the ON-status by the positive voltage with which to charge the capacitor Ciss of the FET Qf. Thereafter, when the positive voltage VT is generated on the secondary winding M, the FET Q11 is turned ON, and the FET Qf is turned OFF.

Thereafter, the saturable reactor Ls hinders the conduction of the electric current trying to flow to the source from the drain of the FET Qs during a period till the FET Qs is turned ON. Then, when the FET Qs is turned ON, the energy is again accumulated in the choke coil L. Hereinafter, the converter 70 repeats the operation described above.

According to the converter 70 in the seventh embodiment, the diode Dd is provided in such a state as to hinder the electric current flowing from the cathode of the Zener diode DZ1. Therefore, during the period till the FET Qf is turned ON after the FET Qs has been turned OFF, it is feasible to prevent the loss caused by the Zener diode DZ1 turning ON in the forward direction in a time till the saturable reactor Lf is saturated.

Next, an eighth embodiment of the present invention will be discussed. In the first four embodiments discussed above, the gate voltage of the FET Qf is operated based on the voltage VT generated on the secondary winding M and the voltage with which the capacitor Ciss is charged. Hence, the gate voltage of the FET Qf oscillates depending on the capacity of the capacitor Ciss, as well as on impedance components of the resistance Rf and the secondary winding M. This might lead to a possibility in which the gate voltage of the FET Qf exceeds the rated value thereof.

Figure 8B:
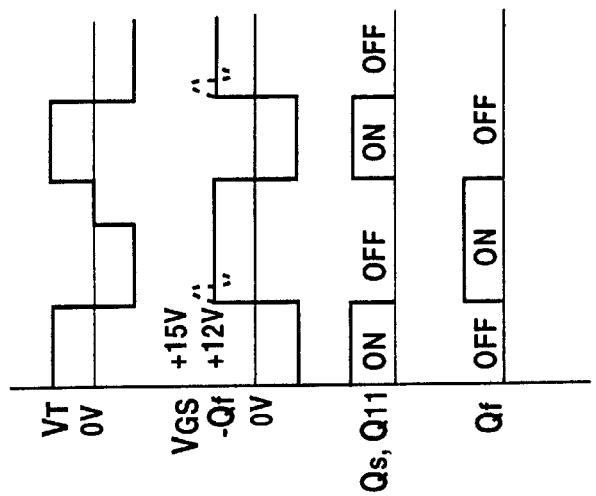
FIG. 8 is a diagram showing a construction of the synchronous rectifying type DC-DC converter in an eighth embodiment.
Figure 8A:
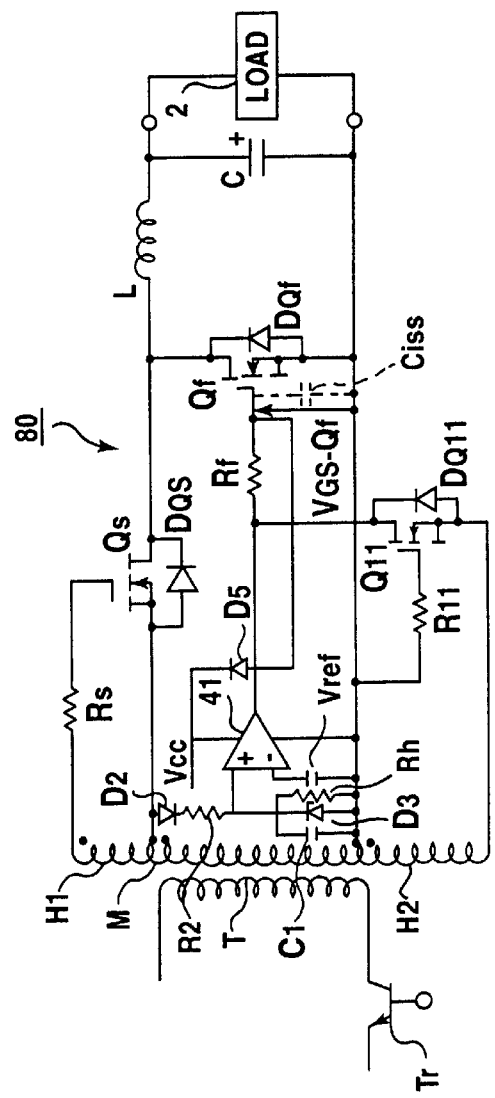

The eighth embodiment is contrived to obviate the problem given above. FIG. 8(a) is a diagram showing a circuit construction of a converter 80 in the eighth embodiment. FIG. 8(b) is a time chart showing an operation of the circuit element illustrated in FIG. 8(a). The converter 80 in the eighth embodiment is, however, constructed by adding new components to the converter 40 described above. Therefore, the common components are marked with the same numerals with an explanatory omission, and only the new components will be explained.

<Circuit Construction of Converter 80>

A conductor is led from the conductor for connecting the other terminal of the resistance Rf to the gate of the FET Qf, and an anode of a diode D5 is connected to this conductor. A cathode of this diode D5 is connected to the constant voltage source for generating the driving voltage Vcc of the comparator 41. The diode D5 hinders the driving voltage Vcc from being applied to the gate of the FET Qf.

<Operation of Converter 80>

An operation of the converter 80 explained above is described. The operation of the converter 80 is, however, substantially the same as the operation of the converter 40, and hence a different operation from the converter 40 is explained. The positive and negative voltages are, as illustrated in FIG. 8(*b*), alternately generated on the secondary winding M of the transformer T with a given magnitude and a given period as the voltage VT in accordance with the voltage application to the primary winding of the transformer T.

During a period for which the FET Qs and the FET Q11 are kept ON, a gate voltage (a gate/source voltage: VGS-Qf in FIG. 8(*b*)) of the FET Qf becomes a negative voltage VT (e.g., −12 V). Thereafter, the polarity of the voltage VT generated on the secondary winding M changes from positive to negative, whereby the positive voltage is generated at the second output terminal of the auxiliary winding H2 and the gate voltage of the FET Qf rises enough to turn ON the FET Qf.

At this time, it is presumed that the gate voltage of the FET Qf oscillates and goes on rising up to a magnitude (e.g., +15 V) exceeding an upper limit of the rated range (see a broken line in FIG. 8(*b*)). Then, the gate voltage of the FET Qf is clamped by the driving voltage Vcc (e.g., +12 V) of the comparator 41, and does not therefore increase up to +15 V bu is restrained down to +12 V. Consequently, the gate voltage falls within the predetermined rated range. Further, an extra current flows toward the power supply via the diode D5, and is utilized as the driving voltage Vcc of the comparator 41.

According to the converter 80 in the eighth embodiment, the gate of the FET Qf is connected to the driving power supply of the comparator 41 through the diode D5. Therefore, the upper limit of the voltage applied to the gate of the FET Qf is clamped by the driving voltage Vcc. Hence, the gate voltage of the FET Qf is restrained from oscillating and rising over the rated range owing to the auxiliary winding H2, the resistance Rf and the capacitor Ciss. Accordingly, the damage to the FET Qf can be prevented.

Figure 9B:
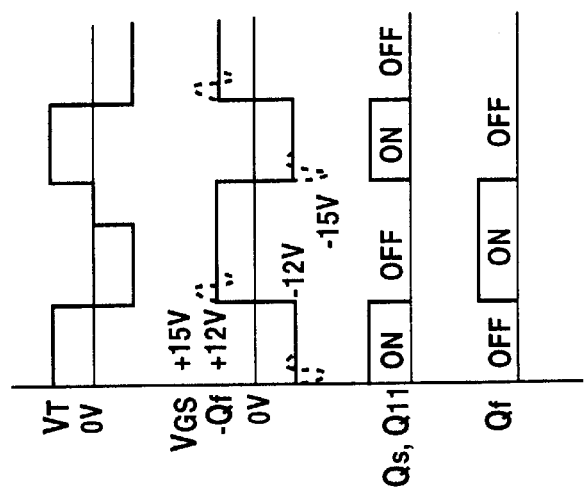
FIG. 9 is a diagram showing a construction of a synchronous rectifying type DC-DC converter in a ninth embodiment.
Figure 9A:
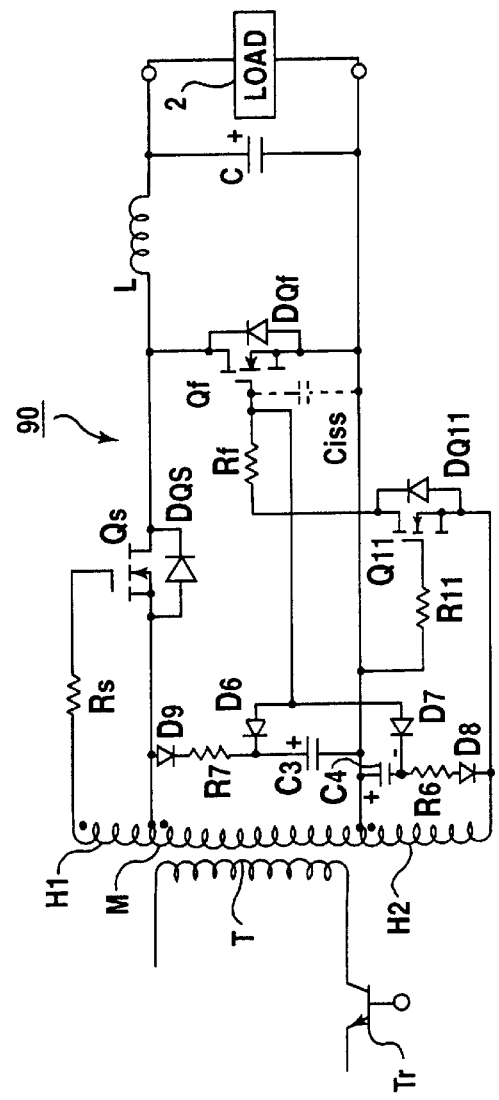

Next, a ninth embodiment of the present invention will be discussed. The ninth embodiment is also, as in the case of the converter 80 in the eighth embodiment, contrived to obviate the problem pertaining to the oscillation of the gate voltage of the FET Qf. FIG. 9(*a*) is a diagram showing a circuit construction of a converter 90 in the ninth embodiment. FIG. 9(*b*) is a time chart showing an operation of the circuit element illustrated in FIG. 9(*a*). The converter 90 in the ninth embodiment is, however, constructed by adding new components to the converter (see FIG. 3(*a*)) described above. Therefore, the common components are marked with the same numerals with an explanatory omission, and only the new components are explained.

<Circuit Construction of Converter 90>

An anode of a diode D9 is connected to a conductor for connecting one terminal of the secondary winding M to the source of the FET Qs. A cathode of the diode D9 is connected to one terminal of a resistance R7. The other terminal of the resistance R7 is connected to one terminal of a capacitor C3. The other terminal of the capacitor C3 is connected to a conductor for connecting the other terminal of the secondary winding M to the source of the FET Qf.

One terminal of a capacitor C4 is connected to a conductor for connecting the other terminal of the secondary winding M to the source of the FET Qf. The other terminal of the capacitor C4 is connected to one terminal of a resistance R6. The other terminal of the resistance R6 is connected to an anode of a diode D8. A cathode of the diode D8 is connected to a conductor for connecting the second output terminal of the auxiliary winding H2 to the source of the FET Q11.

The anode of the diode D6 and the anode of the diode D7 are each connected via the conductor to a conductor for connecting the other terminal of the resistance Rf to the gate of the FET Qf. The cathode of the diode D6 is connected to one terminal of the capacitor C3. The cathode of the diode D7 is connected to the other terminal of the capacitor C4.

Note that the diodes D9, D6, D7, D8, the resistances R7, R6, and the capacitors C3, C4 correspond to a driving electric power control unit according to the present invention.

<Operation of Converter 90>

An operation of the converter 90 described above will be explained. The operation of the converter 90 is, however, substantially the same as the operation of the converter 30, and hence only a different operation from the converter 30 is described. The positive and negative voltages are, as shown in FIG. 9(*b*), alternately generated as the voltage VT on the secondary winding M of the transformer T with a given magnitude and a given period in accordance with the voltage application to the primary winding of the transformer T.

Herein, when the positive voltage VT is generated on the secondary winding M of the transformer T, the FET Qs and the FET Q11 are turned ON, the energy is accumulated in the choke coil L, and the smoothed DC voltage is supplied to the load 2. Further, the positive voltage VT is produced, whereby the electric charge corresponding to the voltage VT is given to the capacitor C3 via the diode D9 and the resistance R7. Furthermore, the positive voltage VT is generated, and simultaneously the positive voltage is produced at one terminal of the auxiliary winding H2, whereby the capacitor C4 is charged with the voltage.

Thereafter, the polarity of the voltage VT generated on the secondary winding M changes from positive to negative, with the result that the positive voltage is generated at the second output terminal of the auxiliary winding H2. Then, the gate voltage (VGS-Qf in FIG. 9(*b*)) of the FET Qf rises, and the FET Qf is turned ON. Herein, the gate of the FET Qf is connected to one terminal of the capacitor C3 via the diode D6, and the polarity of the one terminal of the capacitor C3 at this time is positive. Therefore, the gate voltage of the FET Qf is clamped by the positive voltage (e.g., +12 V) with which the capacitor C3 is charged.

Accordingly, the negative voltage VT is generated on the secondary winding M, and the gate voltage of the FET Qf thereby oscillates. Then, the gate voltage of the FET Qf is, even when trying to increase to such a magnitude (e.g., +15 V) exceeding the upper limit of the rated range, restrained not to exceed +12 V, i.e., the upper limit of the positive voltage with which the capacitor C3 is charged (see the broken line in FIG. 9(*b*)). The gate voltage of the FET Qf is thus restrained within the rated range.

Thereafter, after the transformer T has been magnetically reset and the voltage VT has become "0", the positive voltage VT is again generated on the second winding M, and the FET Q11 is turned ON. The gate voltage of the FET Qf thereby decreases, and the FET Qf is turned OFF.

Herein, the gate of the FET Qf is connected to the other terminal of the capacitor C4 via the diode D7. Further the polarity of the other terminal of the capacitor C4 at this time is negative. With these processes, the gate voltage of the FET Qf is clamped by the negative voltage (e.g., −12 V) with which the capacitor C4 is charged (which corresponds to the driving electric power control unit).

Accordingly, the FET Q11 is turned ON, whereby the gate voltage of the FET Qf oscillates. Then, the gate voltage of the FET Qf is, even when trying to decrease down to a magnitude (e.g., −15 V) under a lower limit of the rated range, restrained to just −12 V, i.e., the lower limit of the negative voltage with which the capacitor C4 is charged (see the broken line in FIG. 9(b)). Accordingly, the gate voltage of the FET Qf is restrained within the rated range.

According to the converter 90 in the ninth embodiment, the gate of the FETf is connected to one terminal of the capacitor C3 via the diode D6. Hence, the upper limit of the voltage applied to the gate of the FET Qf is clamped to the upper limit of the positive voltage with which to charge the capacitor C3. Further, the gate of the FET Qf is connected to the other terminal of the capacitor C4 via the diode D7. Therefore, the lower limit of the voltage applied to the gate of the FET Qf is clamped to the lower limit of the negative voltage with which to charge the capacitor C4.

With these processes, it is feasible to prevent the gate of the FET Qf from increasing above or decreasing under the rated range of the FET Qf due to the oscillations. Accordingly, the damage to the FET Qf can be prevented.

Next, a tenth embodiment of the present invention will be described. In the case of operating a plurality of converters (see FIG. 3(a)) in parallel in the tenth embodiment, there must be produced a difference in the output voltage between the respective converters 30. At this time, the electric current from other converter 30 flows into the converter 30 having a lower output voltage, and further flows through the secondary winding M of the transformer T, whereby the electric current is regenerated on the primary winding of the transformer T and might flow into a rectifier circuit existing anterior to the transformer T.

By the way, the converter 30 and the rectifier circuit existing anterior thereto are not provided with any components for hindering the electric current flowing from the load 2. Consequently, a large quantity of electric current flows into the converter 30 and into the rectifier circuit existing anterior thereto. Hence, there is a possibility in which the converter 30 and the rectifier circuit might be damaged.

Figure 10:
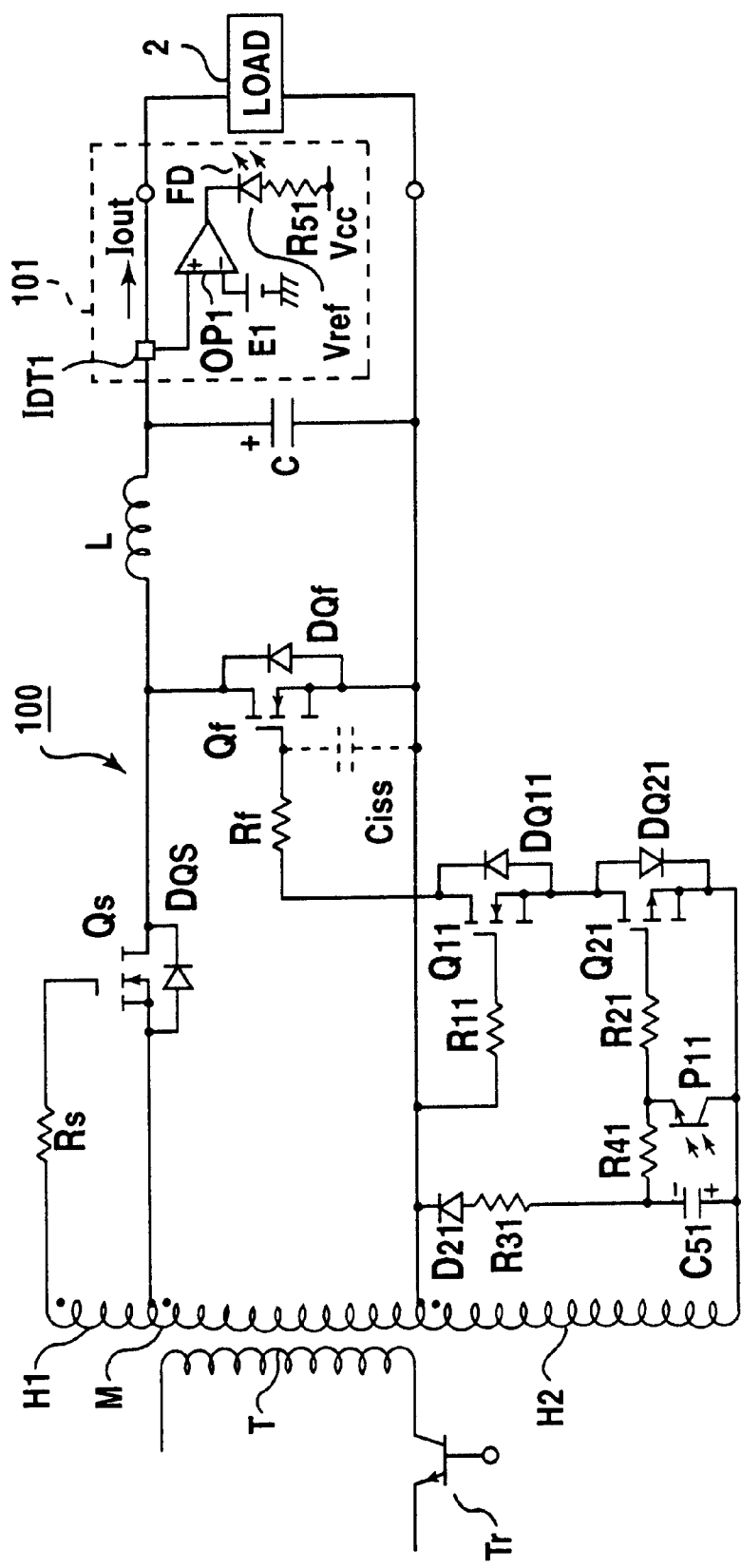
FIG. 10 is a diagram showing a construction of the synchronous rectifying type DC-DC converter in tenth embodiment.

The tenth embodiment is contrived in view of the problem inherent in the converter 30 described above. FIG. 10 is a diagram showing a circuit construction of a converter 100 in the tenth embodiment. The converter 100 in the tenth embodiment is, however, constructed by adding new components to the converter 20 (see FIG. 3(a)). Therefore, the common components are marked with the same numerals with an explanatory omission, and only the new components are explained.

<Circuit Construction of Converter 100>

A source of an FET Q21 classified as a p-channel type MOS-FET is connected via a conductor to the other terminal of the auxiliary winding H2. A drain of the FET Q21 is connected to the source of the FET Q11. Further, the cathode of the diode D21 is connected to the conductor for connecting one terminal of the auxiliary winding H2 to the source of the FET Qf. The anode of the diode D21 is connected to one terminal of the resistance R31. The other terminal of the resistance 31 is connected to one terminal of the capacitor C51. The other terminal of the capacitor C51 is connected to a conductor for connecting the other terminal of the auxiliary winding H2 to the source of the FET Q21.

One terminal of the resistance R41 is connected to the other terminal of the resistance R31 as well as to one terminal of the capacitor C51. The other terminal of the resistance R41 is connected to one terminal of the resistance R21. The other terminal of the resistance R21 is connected to a gate of the FET Q21. Then, a photo coupler PI1 is connected to the other terminal of the resistance R41. The other terminal of the photo coupler PI1 is connected to a conductor for connecting the other terminal of the capacitor C51 to the source of the FET Q21.

Further, a detection circuit for detecting the output current of the converter 100 is provided posterior to the choke coil L. The detection circuit 101 is constructed of a current detector IDT1, an operational amplifier OP1, a constant voltage source E1, a light emitting diode FD, a resistance R51, and a constant voltage source for generating the driving voltage Vcc of the light emitting diode FD.

Herein, the current detector IDT1 is interposed in series between the choke coil L and the load 2, and inputs a voltage corresponding to an output current Iout of the converter 100 to a non-inversion input terminal of the operational amplifier OP1. The constant voltage source E1 inputs the reference voltage Vref to the non-inversion input terminal of the operational amplifier OP1. A cathode of the light emitting diode FD is connected to the output terminal of the operational amplifier OP1, and the anode of the light emitting diode is connected via the resistance R51 to the constant voltage source for generating the driving voltage Vcc.

Further, the operational amplifier OP1 compares the voltage corresponding to the output current Iout inputted with the reference voltage Vref, and, if the voltage corresponding to the output current Iout is smaller than the reference voltage Vref, outputs the negative voltage. The light emitting diode FD thereby emits the light. This light emitting diode FD is actually disposed in such a position that the photo coupler PI1 is capable of receiving the light from the light emitting diode FD. The photo coupler PI1 is switched ON upon receiving the light from the light emitting diode FD, and discharges the electric charges accumulated in the capacitor C51. Further, the reference voltage Vref is set to approximately 0 to 30% of the output current of the converter 100, and, if under this level, the light emitting diode FD emits the light.

Note that the output current Iout is detected between the choke coil L and the load 2, however, the converter 100 may be so constructed as to detect a drain current of the FET Qs, a drain current of the FET Qf or the current of the transformer T instead of the output current Iout.

<Operation of Converter 100>

An operation of the converter 100 described above will hereinafter be explained. The operation of the converter 100 is, however, partially common to the operation of the converter 30, and therefore mainly a different operation from the converter 30 will be explained.

Namely, the positive voltage and the negative voltage are, as in the first embodiment, alternately generated as the voltage VT with a given magnitude and a given period on the secondary winding M of the transformer T in accordance with the voltage application to the primary winding of the transformer T (see FIG. 3(b)).

Herein, it is assumed that the positive voltage VT be generated on the secondary winding M by applying the voltage to the primary winding of the transformer T. At this time, the positive voltage is generated at the first output terminal of the auxiliary winding H1. The FET Qs is thereby turned ON. The FET Q11 is also turned ON subsequent thereto.

The FET Qs is kept ON, during which the energy is accumulated in the choke coil L, and the smoothing capacitor C is charged with the electric charge. The load 2 receives thereby the smoothed DC voltage as an output of the converter 100.

Thereafter, when the polarity of the voltage VT generated on the secondary winding M changes from positive to negative, the gate voltages of the FET Qs and of the FET Q11 decrease, and the FET Qs and the FET Q11 are turned OFF. Further, the polarity of the voltage VT changes from positive to negative, whereby the positive voltage is produced at the second output terminal of the auxiliary winding H2. Charging of this voltage is effected from the other terminal of the capacitor C51. Thereupon, the polarity on the other terminal side of the capacitor C51, and the polarity on the one terminal side becomes negative. The negative voltage is thereby applied to the gate of the FET Q21 via the resistances R41, R21, and the FET Q21 is turned ON.

At this time, supposing that the photo coupler PI1 is turned OFF, it follows that the FET Q21 is turned ON, and the positive voltage generated at the second output terminal of the auxiliary winding H2 is thereby applied to the gate of the FET Qf through the FET Q21, the FET Q11 and the resistance Rf. With this application, the gate voltage of the FET Qf rises, and the FET Qf is turned ON. Thus, the FET Qs is turned OFF while the FET Qf is turned ON, at which time the energy accumulated in the choke coil L is released during the period for which the FET Qs remains ON. The electric current flows through a closed circuit consisting of the choke coil L, the load 2 and the FET Qf.

Incidentally the detection circuit 101, during the operation of the converter 100 described above, detects at any time the voltage corresponding to the output current Iout of the converter 100, and inputs the voltage to the operational amplifier OP1. The operational amplifier OP1 compares the inputted voltage with the reference voltage Vref, and, if this voltage is smaller than the reference voltage Vref, outputs the negative voltage. The light emitting diode FD thereby emits the light.

When the light emitting diode FD emits the light, this light is received by the photo coupler PI1. Thereupon, the photo coupler PI1 is turned ON, and is by itself brought into a short-circuited state. The electric charges accumulated in the capacitor C51 are thereby discharged, and the negative voltage is not applied to the gate of the FET Q21, in which state the FET Q21 is therefore turned OFF.

Then, the positive voltage generated at the second output terminal of the auxiliary winding H2 is not applied to the gate of the FET Qf, and hence the FET Qf is kept in the ON-status by the positive voltage with which the capacitor Ciss is charged. Then, the FET Q21 is turned OFF, and consequently the charging of the capacitor Ciss with the voltage is also stopped, with the result that the FET Qf is turned OFF instantaneously when the electric charges in the capacitor Ciss disappear.

As a matter of course, even when the FET Qf is turned OFF, the electric current flows through the choke coil L, the load 2 and the parasitic diode DQf, and therefore the supply of the electric current to the load does not discontinue. Thereafter, when the current detector ID1 detects the output current equal to or greater than the predetermined value, the photo coupler PI1 is turned OFF, and the electric charges are again accumulated in the capacitor C51.

According to the converter 100 in the tenth embodiment, if the output current Iout of the converter 100 is lower the predetermined value, the FET Q21 is turned OFF, whereby the FET Qf is turned OFF.

Therefore, in the case of the operating the plurality of converters 100 in parallel, the output current any one of the converters 100 is smaller than the output currents of other converters 100, and, even if the output currents from other converters 100 flow into the converter 100 concerned, the electric currents do not flow to the transformer T because of the FET Qf being kept OFF. Accordingly, the damage to the converter 100 itself can be prevented, and the electric current is not regenerated on the side of the primary winding of the transformer T. It is therefore possible to prevent the damage to the rectifier circuit existing anterior to the converter 100.

What is claimed is:

1. A synchronous rectifying type DC-DC converter circuit comprising:

a plurality of DC-DC converters connected in parallel for supplying a predetermined direct current to a load, and for preventing said current from entering one or more of said converters, each of said converters comprising:

a rectifying switch connected in series with a secondary winding of a transformer;

a fly wheel switch connected in parallel with said secondary winding of said transformer; and an auxiliary winding induced by a voltage generated on a primary winding of said transformer, and providing an output having polarities opposite to each other to a control terminal of the rectifying switch and to a control terminal of the fly wheel switch; and a drive keeping circuit for keeping an ON-status of said fly wheel switch during a period for which said transformer is magnetically reset, wherein each of said DC-DC converters turns OFF said fly wheel switch when the output value to said load is smaller than the threshold.

2. A synchronous rectifying type DC-DC converter circuit comprising:

a plurality of DC-DC converters connected in parallel for supplying a predetermined direct current to a load, and for preventing said current from entering one or more of said converters, each of said converters comprising:

a rectifying switch connected in series with a secondary winding of a transformer;

a fly wheel switch connected in parallel with said secondary winding of said transformer; and an auxiliary winding induced by a voltage generated on a primary winding of said transformer, and providing an output having polarities opposite to each other to a control terminal of the rectifying switch and to a control terminal of the fly wheel switch, a drive keeping circuit for keeping an ON-status of said fly wheel switch during a period for which said transformer is magnetically reset, wherein each of said DC-DC converters turns OFF said fly wheel switch when the output of said transformer is smaller than the threshold.

3. A synchronous rectifying type DC-DC converter circuit comprising:

a plurality of DC-DC converters connected in parallel for supplying a predetermined direct current to a load, and for preventing said current from entering one or more of said converters, each of said converters comprising:

a rectifying switch connected in series with a secondary winding of a transformer;

a fly wheel switch connected in parallel with said secondary winding of said transformer; and an auxiliary winding induced by a voltage generated on a primary winding of said transformer, and providing an output having polarities opposite to each other to a control terminal of the rectifying switch and to a control terminal of the fly wheel switch;

a drive keeping circuit for keeping an ON-status of said fly wheel switch during a period for which said transformer is magnetically reset; and a driving voltage control circuit for masking the voltage being applied to the control terminal of said fly wheel fall within an upper limit of the rated range.

4. A synchronous rectifying type DC-DC converter circuit according to claim 3, wherein said driving voltage control circuit restrains, under a voltage value of said constant voltage source, a value of the voltage applied to the control terminal of said fly wheel switch.

5. A synchronous rectifying type DC-DC converter circuit according to claim 3, wherein said driving voltage control circuit supplies an output voltage generated in said transformer to the control terminal of said fly wheel switch.

6. A synchronous rectifying type DC-DC converter circuit comprising:

a plurality of DC-DC converters connected in parallel for supplying a predetermined direct current to a load, and for preventing said current from entering one or more of said converters, each of said converters comprising:

a rectifying switch connected in series with a secondary winding of a transformer;

a fly wheel switch connected in parallel with said secondary winding of said transformer; and an auxiliary winding induced by a voltage generated on a primary winding of said transformer, and providing an output having polarities opposite to each other to a control terminal of the rectifying switch and to a control terminal of the fly wheel switch;

a drive keeping circuit for keeping an ON-status of said fly wheel switch during a period for which said transformer is magnetically reset; and a drive stopping circuit for turning OFF said fly wheel switch when an output does not generate in said transformer for a predetermined time.

7. A synchronous rectifying type DC-DC converter circuit according to claim 6, wherein said drive stopping circuit includes a comparing circuit for detecting and comparing a voltage corresponding to the output of said transformer with a threshold, and supplying said fly wheel switch with a signal indicating a result of the comparison.

8. A synchronous rectifying type DC-DC converter circuit according to claim 6, further comprising:

a clamp circuit restraining an inter-channel voltage of said fly wheel switch kept in an OFF-status under a predetermined value.

9. A synchronous rectifying type DC-DC converter circuit according to claim 8, wherein said clamp circuit includes a Zener diode connected in parallel to said fly wheel switch.

10. A synchronous rectifying type DC-DC converter circuit according to claim 9, further comprising:

a first saturable reactor connected in series to said rectifying switch; and a second saturable reactor connected in series to said fly wheel switch.

11. A synchronous rectifying type DC-DC converter circuit according to claim 10, wherein said clamp circuit includes a diode disposed in series to said Zener diode and having a cathode connected to a cathode of said Zener diode.

12. A synchronous rectifying type DC-DC converter circuit according to claim 8, wherein said clamp circuit restrains the inter-channel voltage of said fly wheel switch under a voltage value of a constant voltage source.

13. A synchronous rectifying type DC-DC converter circuit, comprising:

a plurality of DC-DC converters connected in parallel for supplying a predetermined direct current to a load, and for preventing said current from entering one or more of said converters, each of said converters comprising:

a rectifying switch connected in series with a secondary winding of a transformer;

a fly wheel switch connected in parallel with said secondary winding of said transformer;

an auxiliary winding induced by a voltage generated on a primary winding of said transformer, and providing an output having polarities opposite to each other to a control terminal of the rectifying switch and to a control terminal of the fly wheel switch; and a drive keeping circuit for keeping an ON-status of said fly wheel switch during a period for which said transformer is magnetically reset, wherein said drive keeping circuit includes accumulating means for accumulating an energy generated in said transformer and supplying the energy to the control terminal of said fly wheel switch.

* * * * *